United States Patent [19]
Jyu et al.

[11] Patent Number: 5,880,967
[45] Date of Patent: Mar. 9, 1999

[54] MINIMIZATION OF CIRCUIT DELAY AND POWER THROUGH TRANSISTOR SIZING

[75] Inventors: Henry Horng-Fei Jyu, Sunnyvale; An-Chang Deng, Saratoga, both of Calif.

[73] Assignee: Synopsys, Inc., Mt. View, Calif.

[21] Appl. No.: 431,988

[22] Filed: May 1, 1995

[51] Int. Cl.⁶ .................................................. G06F 17/50
[52] U.S. Cl. ........................... 364/489; 364/488; 364/578
[58] Field of Search ................................... 364/488, 489, 364/490, 491, 578

[56] References Cited

U.S. PATENT DOCUMENTS

| | | | |
|---|---|---|---|
| 4,198,697 | 4/1980 | Kuo et al. | 365/210 |
| 4,495,628 | 1/1985 | Zasio | 377/70 |
| 4,587,480 | 5/1986 | Zasio | 324/73 R |
| 4,698,760 | 10/1987 | Lembach et al. | 364/490 |
| 4,827,428 | 5/1989 | Dunlop et al. | 364/491 |
| 4,907,180 | 3/1990 | Smith | 369/578 |
| 5,235,521 | 8/1993 | Johnson et al. | 364/489 |
| 5,349,542 | 9/1994 | Brasen et al. | 364/578 |
| 5,446,676 | 8/1995 | Huang et al. | 369/578 |
| 5,459,673 | 10/1995 | Carmean et al. | 364/489 |
| 5,508,937 | 4/1996 | Abato et al. | 364/488 |
| 5,541,849 | 7/1996 | Rostoker et al. | 364/489 |
| 5,553,008 | 9/1996 | Huang et al. | 364/578 |
| 5,557,531 | 9/1996 | Rostoker et al. | 364/489 |

OTHER PUBLICATIONS

Vishwani D. Agrawal, "Synchronous Path Analysis In Mos Circuit Simulator," 19th Design Automation Conference, 1992 IEEE, Paper 35.4, pp. 629–635.

Norman P. Jouppi, "Timing Analysis for nMOS VLSI," 20th Design Automation Conference, 1983 IEEE, Paper 27.3, pp. 411–418.

William H. Kao et al., "Algorithms for Automatic Transistor Sizing in CMOS Digital Circuits," 22nd Design Automation Conference, 1985 IEEE, Paper 46.2, pp. 781–784.

Tzu–Mu Lin et al., "Signal Delay in General RC Networks With Application To Timing Simulation of Digital Integrated Circuits," Conference on Advanced Research in VLSI, M.I.T., Jan. 24, 1984, pp. 93–99.

Mark D. Matson, "Optimization of Digital MOS VLSI Circuits," 1985, *Chapel Hill Conference on Very Large Scale Integration*, Edited by Henry Fuchs, pp. 109–126.

Fred W. Obermeier et al., "An Electrical Optimizer That Considers Physical Layout," 25th ACM/IEEE Design Automation Conference, 1988, IEEE, Paper 29.3, pp. 453–459.

John K. Ousterhout, "Switch–Level Delay Models For Digitals MOS VLSI," 21st Design Automation Conference, 1984 IEEE, Paper 32.3, pp. 542–548.

AIDA Timing Verifier Technical Spec, pp. 1–4.

Aron, "The Program Development Process, The Programming Team, Part II," in *The Systems Programming Series*, Adison–Wesley, pp. 605–607, 1983.

Berkelaar, et al., "Computing the Entire Active Area/Power Consumption Versus Delay Trade–off Curve for Gate Sizing with a Piecewise Linear Simulator,"*Proc. of Int'l. Conference on Computer–Aided Design*, pp. 474–480, Nov. 1994.

Black, "Electromigration Failure Modes in Aluminum Metallization for Semiconductor Devices," *Proc. of the IEEE*, 57(9):1587–1594, 1969.

Burch, et al., "Pattern–Independent Current Estimation for Reliability Analysis of CMOS Circuits," *Proc. of the IEEE Design Automation Conf.*, pp. 294–299, 1988.

Chan, et al., "Managing IC Power Needs," *High Performance Systems*, pp. 69–70, 73–74, 1990.

(List continued on next page.)

*Primary Examiner*—Kevin J. Teska
*Assistant Examiner*—Leigh Marie Garbowski
*Attorney, Agent, or Firm*—Townsend and Townsend and Crew LLP

[57] ABSTRACT

A method for minimizing signal delay and power consumption is provided. Through combined power simulation and delay analysis, iterative transistor resizing is performed based on a variety of factors including relative delay of associated circuit paths, nodal switching activities and association of transistors in channel-connected sets.

20 Claims, 30 Drawing Sheets

OTHER PUBLICATIONS

Chawla, et al., "MOTIS, An MOS Timing Simulator," *IEEE Trans. on Circuits and Systems*, CAS–22(12):901–910, 1975.

Chowdhury, et al., "Minimal Area Sizing for Power and Ground Nets for VLSI Circuits," *Proc. of the 4th MIT Conference on Advanced Research in VLSI*, pp. 141–169, 1986.

de Geus, "Logic Synthesis Speeds ASIC Design," *IEEE Spectrum, pp. 27–31*, Aug. 1989.

Deng, "Power Analysis for CMOS/BiCMOS Circuits," *Int'l. Workshop on Low Power Design*, pp. 3–8, Apr. 1994.

Fan, et al., "MOTIS–C: A New Circuit Simulator for MOS LSI Circuits," *Proc. of ISCAS*, pp. 700–703, 1977.

Fishburn, et al., "TILOS: A Posynominal Programming Approach to Transistor Sizing," *Proc. of Int'l. Conference on Computer–Aided Design*, pp. 326–328, 1985.

Glasser, et al., *The Design and Analysis of VLSI Circuits*, Addison–Wesley, pp. 97–101,1985.

Halliday, "dV/dt Automates Creating Timing Diagrams," *Design Management*, 15(5), 1991.

Hedlund, "Electrical Optimiztion of PLA's, " *Proc. of Design Automation Conference*, pp. 681–687, Jun. 1985.

Jagau, "Simcurrent—An Efficient Program for the Estimation of the Current Flow of Complex CMOS Circuits," *IEEE ICCAD Digest of Technical Papers*, pp. 396–399, 1990.

Newton, "Techniques for the Simulation of Large–Scale Integrated Circuits," *IEEE Trans. on Circuits and Systems*, CAS–26(9):741–749, 1979.

Odryna, et al., "The ADEPT Timing Simulation Algorithm," *VLSI Systems Design*, pp. 24–34, 1986.

Pathmill User Manual 3.1, *EPIC Design Technology Inc.*, Jul. 1994.

Rubinstein, et al., "Signal Delay in RC Tree Networks," *IEEE Transactions on Computer–Aided Design*, 2:202–211, Jul. 1983.

Ruehli, et al., "Analytical Power/Timing Optimization Technique for Digital System," *Proc. of Design Automation Conference*, pp. 142–146, Jun. 1977.

Saleh, et al., "Iterated Timing Analysis in SPLICE 1," *ICCAD Digest of Technical Papers*, pp. 139–140, 1983.

Song, et al., "Power Disctribution Tecgniques for VLSI Circuits," *IEEE J. of Solid–State Circuits*, SC–21(1):150–156, 1986.

Spatnekar, et al., "An Exact Solution to the Transistor Sizing Problem for CMOS CIrcuits Using Convex Optimization," *IEEE Transactions on Computer–Aided Design*, 12(11):1621–1634, Nov. 1993.

Tamiya, et al., "LP Based Cell Selection with Costraints of Timing, Area, and Power Consumption," *Proc. of Int'l. Conference on Computer–Aided Design*, pp. 378–381, Nov. 1994.

Terman, "Simulation Tools for Digital LSI Design," Ph.D. thesis, Massachusetts Institute of Technology, Laboratory for Computer Science, 1983.

Terman, *Circuit Description and Simulation—NET, CNET, RSIM, PRESIM and NL User's Manual*, Massachusetts Institute of Technology, 1986.

Yamada, et al., "Synergistic Power/Area Optimization with Transistor Sizing and Wire Length Minimization," *Proc. of IEEE Symposium on Low Power Electronics*, pp. 50–51, Oct. 1994.

```
case 4:   /* slack driven */
   if (val->dc > -15 ) return 'c';
   else if (val->ds > -10 ) return 's';
   else if (val->di > -10 ) return 'i';
   else {
      g_opt->stw = pow (val->di / -10, 0.5);
      fp = a_fopen (ampscfg_s, "w"); /* get a brand new start,
         flush out cfg_s since init is changed */
      fclose(fp);
      return 's';
```

FIG. 7C.

```
static void
ps_adapt (max_pd, area)
double max_pd, area;
{
  double pp_ratio;
  amp_opt->only_up = 0;
  amp_opt->only_down = 0;
  amp_opt->s2 = 0.5;
  amp_opt->p2 = 0.8;
  amp_opt->d_wt =, amp_opt->dcoef/(amp_opt->pcoef+amp_opt->acoef0;
  if (amp_opt->d_wt > 1000) amp_opt->d_wt = 1000;
  switch (amp_opt->amps_mode ){
  case 0: /* cost * + */
  case 1:
      if (amp_opt->d_wt < 0.2 ) {
        if (d_cost (max_pd/1000.0, area) > 0 ) {
            amp_opt->scale = in_linear (amp_opt->d_wt, 0.2, 2.5, 0.0, 1.5);
            amp_opt->pdp = in_linear (amp_opt->d_wt, 0.2, 0.85, 0.0, 0.99);
        }
        else {
            amp_opt->scale = in_linear (amp_opt->d_wt, 0.2, 1.5, 0.0, 1.0);
            amp_opt->pdp = 1.1;
        }
        amp_opt->s2 = in_linear (amp_opt->d_wt, 0.2, 0.75, 0.0, 0.5);
        amp_opt->p2 = in_linear (amp_opt->d_wt, 0.2, 0.9, 0.1, 1.0);
      }
      else if (amp_opt->d_wt > 5) {
        amp_opt->scale = in_linear (amp_opt->d_wt, 5.0, 2.5, 1000.0, 3.0);
        amp_opt->pdp = in_linear (amp_opt->d_wt, 5.0, 0.85, 1000.0, 0.8);
        if (d_cost (max_pd/1000.0, area) >0) {
            amp_opt->s2 =in_linear (amp_opt->d_wt, 5.0, 0.75, 1000.0, 0.9);
            amp_opt->p2 =in_linear (amp_opt->d_wt, 5.0, 0.9, 1000.0, 0.4);
        }
        else {
            amp_opt->s2 = in_linear (amp_opt->d_wt, 5.0, 0.9, 1000.0, 1.0);
            amp_opt->p2=in_linear(amp_opt->d_wt,5.0, 0.4, 1000.0, 0.001);
        }
      }
      else if (amp_opt->d_wt > 1){
        amp_opt->scale = in_linear (amp_opt->d_wt, 1.0, 2.0, 5.0, 2.5);
        amp_opt->pdp = in_linear (amp_opt->d_wt, 1.0, 0.9, 5.0, 0.85);
        amp_opt->s2 = in_linear (amp_opt->d_wt, 1.0, 0.83, 5.0, 0.9);
        amp_opt->p2 = in_linear (amp_opt->d_wt, 1.0, 0.7, 5.0, 0.4);
      }
```

*FIG. 11C.*

```
    else {
        amp_opt->scale = in_linear (amp_opt->d_wt, 0.2, 1.5, 1.0, 2.0);
        amp_opt->pdp = in_linear (amp_opt->d_wt, 0.2, 0.99, 1.0, 0.9);
        amp_opt->s2 = in_linear (amp_opt->d_wt, 0.2, 0.75, 1.0, 0.83);
        amp_opt->p2 = in_linear (amp_opt->d_wt, o.2, 0.9, 1.0, 0.7);
    }
    break;
case2: /* d_req */
    pp_ratio = amp_opt->dreq*1000/max_pd;
    if ( pp_ratio < 1) {
        amp_opt->pdp = pp_ratio *pp_ratio ;
        if (amp_opt->pdp < 0.8)
            amp_opt->pdp = 0.8;
        else if ( amp_opt->pdp > 0.97 )
            amp_opt->pdp = amp_opt->pdp * amp_opt->pdp;
        amp_opt->scale = 3 - 1.3 * pp_ratio;
        if (amp_opt->scale > 2.5) amp_opt-> scale = 2.5;
        amp_opt->p2 = 0.7;
        amp_opt->s2 = 0.7;
    }
    else {
        if (pp_ratio > 10) pp_ratio = 10;
        amp_opt->pdp = in_linear (pp_ratio, 1.0, 0.999, 10.0, 1.2);
        amp_opt->scale = in_linear (pp_ratio, 1.0, 1.5, 10.0, 1.0);
        amp_opt->p2 = in_linear (pp_ratio, 1.0, 0.7, 10.0, 1.1);
        amp_opt->s2 = in_linear (pp_ratio, 1.0, 0.7, 10.0, 0.5);
    }
    break;
case 3: /* p_req */
    pp_ratio = amp_opt->preq/amp_opt->power;
    if (pp_ratio > 10) pp_ratio = 10;
    if (pp_ratio > 1) { /* satisfy */
        amp_opt->pdp = in_linear (pp_ratio, 1.0, 0.999, 10.0, 0.8);
        amp_opt->scale = in_linear (pp_ratio, 1.0, 1.5, 10.0, 3.0);
        amp_opt->p2 = in_linear (pp_ratio, 1.0, 0.7, 10.0, 0);
        amp_opt->s2 = in_linear (pp_ratio, 1.0, 0.85, 10.0, 1.0);
    }
    else {
        amp_opt->pdp = 0.999;
        amp_opt->scale = 1.5;
        amp_opt->p2 = 0.999001;
        amp_opt->s2 = pp_ratio*pp_ratio ;
    }
    break;
```

*FIG. 11C(continued).*

```
}
else{                           /* target on slack */
    if (max_slk < -10) {
        margin = -5; /* don't be too aggressive */
        amp_opt->scale = 3;
        amp_opt->pdp = 1;
    }
    else if (max_slk < -5) {
        margin = 0;  /* include more improve efficiency */
        amp_opt->scale = 2.5;
        amp_opt->pdp = 0.9;
    }
    else if (max_slk < -2) {
        margin = 1; /* include more improve efficiency */
        amp_opt->scale = 2;
        amp_opt->pdp = 0.9;
    }
    else {
        margin = 0; /* close now, reduce speed*/
        amp_opt->scale = 1.5;
        amp_opt->pdp = 0.8;
    }
    resize_e (amp_db, margin, max_slk);
```

*FIG. 11D.*

```
Resize (threshold, scale_up, scale_down, circuit)
{   For (each CMOS tx (transistor) in the circuit) {
        pd = path_delay (tx);
        cap = loading-capacitance (tx);

If (pd/ maximum_path_delay>threshold) {/*size up to reduce delay*/ ratio = 1+scale_up*norm(pd/maximum_path_delay) * norm(( cap/ maximum_cap) 1/3)

}
        else { /* size down to reduce power consumption */ ratio = (1-scale_down)+scale_down* norm( pd/ maximum_path_delay) * norm((cap/maximum_cap)1/3)
        }
        If (user specify node_switch) {
            sw = switching_activities (tx);
            ratio = adjust (SW, ratio);

}
    }   /* for tx loop */
        If (size at gate level) {
            for (all CMOS tx$_j$ which are channel connected) {
                new_ratio = average$_j$(tx$_j$);
            }
        }
        new_size = old_size * ratio;
}
norm (x) {
        return a normalized value (between 0 and 1) proportional to x;
}
```

*FIG. 12.*

ADJUST (SW, ratio)
    If ratio > 1.5
        then ratio = (ratio - 1.5) * (1 - SW) + 1.5
    else if ratio <1.0
        then ratio = (ratio - scale_down) * (1-SW) + scale_down
    end

*FIG. 13.*

```
stop-check () { /* is yes, 0 is no */
if (iterations > max_loop)      return 1;
else {
    switch (running mode) {
        case 'cost_fx':     if (cost degrade too much)
                                return 1;
        case 'delay-req':   if (delay requirement is satisfied && power
                               degrades too much)
                                return 1;
                            else return 0;
        case 'power_req':   if (power_requirement is satisfied && delay
                               degrades too much)
                                return 1;
                            else return 0;
        case 'slack_driven': if (slack requirement is satisfied && power
                               degrades too much)
                                return 1;
                            else return 0;
    }
}
    return 0;
}
```

*FIG. 14.*

```
/* Rturns cap in fetofarads */
double
estimateWireCapacitance (node_name, number_channel, number_gate,
                         number_input, number_output, number_biput,
                         max_pwl, max_nwl, area)
    char         *node_name;
    int          number_channel, number_gate;
    int          number_input, number_output, number_biput;
    int          max_pwl, max_nwl, area;
{
#define FANIN_CAP 2.0
define FANOUT_CAP 5.0 int fanin, fanout;
    double fanout_scale, cap, area_effect;

/* Treat channels as fanin's and biputs as fanout's */
    fanin = number_channel + number_output;
    fanout = number_gate + number_input + number_biput;

/* Select a scaling factor based on number of fanout's */
    if (fanout >= 15)
        fanout_scale = 1.5;
    else if (fanout >= 5)
        fanout_scale = 1.2;
    else
        fanout_scale = 1.0;

cap = fanin * FANIN_CAP + fanout * FANOUT_CAP * fanout_scale;
/* This is a sample for considering the area effects
        area_effect = pow ( area /200.00, 0.3333);
        cap * = area_effect;
*/
        return (cap);
#undef FANIN_CAP
#undef FANOUT_CAP
}
```

```
Mode: Slack_Driven
up=300.00u low=1.00u wire=1 toggle=1 size_level=tx
Number of elements = 6
```
{ 2002 }

|  | power (mW) | (Leak) (%) | slack (ns) | width (um) | [power (change in %) | power slack in %) | slack width] |
|---|---|---|---|---|---|---|---|
| Initial: 0.071 | (30.81%) | -2.83 | 20.0 | [ 0.00% | 0.00% | 0.00% ] |
| S 0.500: 0.059 | (26.30%) | -5.75 | 10.0 | [ -16.90% | 103.18% | -50.00% ] |
| C 1.00u: 0.052 | (22.47%) | 5.63 | 6.0 | [ -26.76% | 99.05% | -70.00% ] |
| Auto select: Change 1.00u.... | | | | | | |
| 1 th : 0.054 | (19.90%) | -3.65 | 9.0 | [ 23.94% | 28.88% | -55.00% ] |
| 2 th : 0.058 | (22.19%) | -2.32 | 13.5 | [ -18.31% | -17.89% | -32.50% ] |
| 3 th : 0.061 | (19.71%) | -1.45 | 20.2 | [ -14.08% | -48.92% | 1.10% ] |
| 4 th : 0.071 | (22.43%) | -0.85 | 30.2 | [ 0.00% | -69.85% | 51.10% ] |
| 5 th : 0.082 | (23.92%) | -0.45 | 43.7 | [ 15.49% | -84.13% | 118.45% ] |
| 6 th : 0.092 | (23.35%) | -0.14 | 56.1 | [ 29.58% | -95.16% | 180.55% ] |
| 7 th : 0.118 | (26.64%) | 0.04 | 84.2 | [ 66.20% | 101.31% | 321.05% ] |
| 8 th : 0.107 | (27.81%) | -0.05 | 67.3 | [ 50.70% | -98.27% | 236.75% ] |
| 9 th : 0.123 | (23.82%) | 0.10 | 90.0 | [ 73.24% | -96.64% | 350.00% ] |
| 10 th : 0.130 | (24.62%) | 0.09 | 104.3 | [ 83.10% | 103.04% | 421.30% ] |

```
Power   usr_time = 13.00 sec. sys_time = 0.00 sec
Delay   usr_time = 11.00 sec. sys_time = 0.00 sec
Total   usr_time = 24.19 sec. sys_time = 0.28 sec
```

Mode: D_req = 4.000 ns
up=300.00u low=1.00u wire=1 toggle=1 size_level=tx
Number of elements = 6

| | power (mW) | (Leak) (%) | delay (ns) | width (um) | [power (change in %) | delay | width] | cost_fx |
|---|---|---|---|---|---|---|---|---|
| Initial: | 0.071 | (30.81%) | 3.83 | 20.0 | [ 0.00% | 0.00% | 0.00% ] | 1.000 |
| S 0.500: | 0.059 | (26.30%) | 6.75 | 10.0 | [ -16.90% | 76.23% | -50.00% ] | 0.732 |
| C 1.00u: | 0.052 | (22.47%) | 6.63 | 6.0 | [ -26.76% | 73.18% | -70.00% ] | 0.381 |

Auto select: Change 1.00u...

| | | | | | | | | |
|---|---|---|---|---|---|---|---|---|
| 1 th : | 0.052 | (19.62%) | 4.62 | 7.4 | [ -26.76% | 20.66% | -63.20% ] | 0.325 |
| 2 th : | 0.055 | (21.53%) | 3.69 | 8.8 | [ -22.54% | -3.58% | -56.15% ] | 0.328 |
| 3 th : | 0.054 | (21.55%) | 5.06 | 8.3 | [ -23.94% | 32.23% | -58.45% ] | 0.418 |
| 4 th : | 0.054 | (20.92%) | 3.64 | 8.3 | [ -23.94% | -5.04% | -58.35% ] | 0.301 |
| 5 th : | 0.053 | (21.18%) | 5.01 | 7.9 | [ -25.35% | 30.87% | -60.40% ] | 0.387 |
| 6 th : | 0.055 | (22.56%) | 3.63 | 8.1 | [ -22.54% | -5.28% | -59.40% ] | 0.298 |
| 7 th : | 0.054 | (19.41%) | 4.32 | 9.6 | [ -23.94% | 12.88% | -52.05% ] | 0.412 |
| 8 th : | 0.054 | (21.10%) | 3.66 | 8.1 | [ -23.94% | -4.41% | -59.45% ] | 0.295 |
| 9 th : | 0.057 | (22.38%) | 4.32 | 9.3 | [ -19.72% | 12.72% | -53.35% ] | 0.422 |
| 10 th : | 0.052 | (18.89%) | 3.67 | 7.9 | [ -26.76% | -4.13% | -60.30% ] | 0.279 |

Power usr_time = 13.00 sec. sys_time = 0.00 sec
Delay usr_time =  9.00 sec. sys_time = 0.00 sec
Total usr_time = 22.12 sec. sys_time = 0.22 sec

FIG. 21.

Mode: P_req = 0.060 mW
up=300.00u low=1.00u wire=1 toggle=1 size_level=tx
Number of elements = 6

|  | power (mW) | (Leak) (%) | delay (ns) | width (um) | [power (change | delay in %) | width] | cost_fx |
|---|---|---|---|---|---|---|---|---|
| Initial: | 0.071 | (30.81%) | 3.83 | 20.0 | [ 0.00% | 0.00% | 0.00% ] | 1.000 |
| S 0.500: | 0.059 | (26.30%) | 6.75 | 10.0 | [ -16.90% | 76.23% | -50.00% ] | 0.732 |
| C 1.00u: | 0.052 | (22.47%) | 6.63 | 6.0 | [ -26.76% | 73.18% | 70.00% ] | 0.381 |
| Auto select: Change 1.00u... | | | | | | | | |
| 1 th : | 0.052 | (20.46%) | 4.71 | 7.0 | [ -26.76% | 23.03% | -64.85% ] | 0.317 |
| 2 th : | 0.054 | (20.41%) | 4.24 | 8.5 | [ -23.94% | 10.79% | -57.65% ] | 0.357 |
| 3 th : | 0.055 | (22.69%) | 3.96 | 8.7 | [ -22.54% | 3.50% | -56.50% ] | 0.349 |
| 4 th : | 0.056 | (20.55%) | 3.58 | 9.8 | [ -21.13% | -6.63% | -51.25% ] | 0.359 |
| 5 th : | 0.055 | (19.85%) | 3.37 | 10.1 | [ -22.54% | -12.09% | -49.75% ] | 0.342 |
| 6 th : | 0.057 | (20.86%) | 3.04 | 11.4 | [ -19.72% | -20.61% | -43.00% ] | 0.363 |
| 7 th : | 0.057 | (20.53%) | 2.88 | 11.8 | [ -19.72% | -24.65% | -41.25% ] | 0.355 |
| 8 th : | 0.059 | (20.66%) | 2.62 | 13.4 | [ -16.90% | -31.63% | -33.00% ] | 0.381 |
| 9 th : | 0.058 | (18.27%) | 2.51 | 13.8 | [ -18.31% | -34.45% | -30.80% ] | 0.371 |
| 10 th : | 0.062 | (21.49%) | 2.30 | 15.9 | [ -12.68% | -40.04% | -20.70% ] | 0.415 |

Power usr_time = 13.00 sec. sys_time = 0.00 sec
Delay usr_time = 9.00 sec. sys_time = 0.00 sec
Total usr_time = 24.23 sec. sys_time = 0.23 sec

FIG. 22.

Mode: Cost_fx = 1.000000 * power + 5.000000 * d + 1.000000 * area
up=300.00u low=1.00u wire=1 toggle=1 size_level=tx cell_mode=0
Number of elements = 6

|  | power (mW) | (Leak) (%) | delay (ns) | width (um) | [power (change in %) | delay | width] | cost_fx |
|---|---|---|---|---|---|---|---|---|
| Initial: | 0.071 | (30.81%) | 3.83 | 20.0 | [ 0.00% | 0.00% | 0.00% ] | 7.000 |
| S 0.500: | 0.059 | (26.30%) | 6.75 | 10.0 | [ -16.90% | 76.23% | -50.00% ] | 10.143 |
| C 1.00u: | 0.052 | (22.47%) | 6.63 | 6.0 | [ -26.76% | 73.18% | -70.00% ] | 9.691 |
| Auto select: Change 2.24u.... |
| 1 th : | 0.058 | (21.71%) | 3.35 | 13.4 | [ -18.31% | -12.59% | -33.10% ] | 5.856 |
| 2 th : | 0.060 | (21.96%) | 2.52 | 15.8 | [ -15.49% | -34.21% | -21.25% ] | 4.922 |
| 3 th : | 0.065 | (21.75%) | 1.88 | 22.8 | [ -8.45% | -50.98% | 14.05% ] | 4.507 |
| 4 th : | 0.073 | (21.12%) | 1.46 | 34.2 | [ 2.82% | -61.87% | 71.20% ] | 4.647 |
| 5 th : | 0.091 | (25.73%) | 1.18 | 51.4 | [ 28.17% | -69.10% | 156.90% ] | 5.395 |
| 6 th : | 0.113 | (26.39%) | 1.00 | 77.1 | [ 59.15% | -73.88% | 285.35% ] | 6.751 |
| 7 th : | 0.137 | (23.02%) | 0.88 | 115.6 | [ 92.96% | -77.10% | 478.00% ] | 8.855 |
| 8 th : | 0.180 | (22.87%) | 0.80 | 173.4 | [ 153.52% | -79.24% | 767.20% ] | 12.245 |
| 9 th : | 0.267 | (28.81%) | 0.74 | 260.2 | [ 276.06% | -80.67% | 1200.85% ] | 17.735 |
| 10 th : | 0.367 | (27.75%) | 0.70 | 390.3 | [ 416.90% | -81.59% | 1851.40% ] | 25.604 |

Power usr_time = 13.00 sec. sys_time = 0.00 sec
Delay usr_time = 10.00 sec. sys_time = 0.00 sec
Total usr_time = 23.20 sec. sys_time = 0.15 sec

FIG. 23.

Mode: Cost_fx = power ^ 25.000000 * d ^ 1.000000 * area ^ 1.000000
up=300.00u low=1.00u wire=1 toggle=1 size_level=tx
Number of elements = 6

| | power (mW) | (Leak) (%) | delay (ns) | width (um) | [power (change in %) | delay | width] | cost_fx |
|---|---|---|---|---|---|---|---|---|
| Initial: | 0.071 | (30.81%) | 3.83 | 20.0 | 0.00% | 0.00% | 0.00% | 1.000 |
| S 0.500: | 0.059 | (26.30%) | 6.75 | 10.0 | -16.90% | 76.23% | -50.00% | 0.009 |
| C 1.00u: | 0.052 | (22.47%) | 6.63 | 6.0 | -26.76% | 73.18% | -70.00% | 2.16e-04 |
| Auto select: Change 1.00u... | | | | | | | | |
| 1 th : | 0.052 | (22.26%) | 6.12 | 6.2 | -26.76% | 59.70% | -69.00% | 2.06e-04 |
| 2 th : | 0.051 | (17.80%) | 5.65 | 6.4 | -28.17% | 47.45% | -67.95% | 1.21e-04 |
| 3 th : | 0.055 | (24.31%) | 5.22 | 6.6 | -22.54% | 36.43% | -66.85% | 7.64e-04 |
| 4 th : | 0.055 | (24.36%) | 4.84 | 6.9 | -22.54% | 26.38% | -65.60% | 7.34e-04 |
| 5 th : | 0.055 | (23.41%) | 4.47 | 7.2 | -22.54% | 16.77% | -64.25% | 7.05e-04 |
| 6 th : | 0.055 | (22.74%) | 4.18 | 7.5 | -22.54% | 9.09% | -62.75% | 6.86e-04 |
| 7 th : | 0.052 | (20.09%) | 6.69 | 6.2 | -26.76% | 74.82% | -69.05% | 2.25e-04 |
| 8 th : | 0.052 | (21.41%) | 6.16 | 6.2 | -26.76% | 60.80% | -69.15% | 2.06e-04 |
| 9 th : | 0.051 | (19.03%) | 5.68 | 6.4 | -28.17% | 48.39% | -69.00% | 1.21e-04 |
| 10 th : | 0.054 | (21.98%) | 5.25 | 6.6 | -23.94% | 37.03% | -66.80% | 4.86e-04 |

Power usr_time = 13.00 sec. sys_time = 0.00 sec
Delay usr_time = 8.00 sec. sys_time = 0.00 sec
Total usr_time = 22.12 sec. sys_time = 0.25 sec

$$\Delta D = D_1 - D_2$$

$$\Delta P = \underbrace{\sum_1 C_i * t_i}_{CELL\ 3302} - \underbrace{\sum_2 C_i * t_i}_{CELL\ 3304}$$

MINIMIZATION OF CIRCUIT DELAY AND POWER THROUGH TRANSISTOR SIZING

CROSS-REFERENCE TO RELATED APPLICATIONS

U.S. Patent Applications for "TRANSISTOR-LEVEL TIMING AND POWER SIMULATOR AND POWER ANALYZER," Ser. No. 08/040,531 filed Mar. 29, 1993, and "POWER DIAGNOSIS FOR VLSI DESIGNS," Ser. No. 08/231,207 filed Apr. 21, 1994, are hereby expressly incorporated by reference in their entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PAPER APPENDIX

A Paper Appendix of a source code listing of an embodiment of the invention comprising 104 sheets has not been printed, but can be found in the application file wrapper. The Appendix includes source code for "amps", "amps_d" and "spice2e".

BACKGROUND OF THE INVENTION

The present invention relates to computer-aided design (CAD) tools for analyzing integrated circuits and, more particularly, to a transistor autosizer that minimizes delay and power consumption of a CMOS circuit.

In CMOS integrated circuit design, it is well known that the size of a transistor can affect its performance. Transistor sizing therefore has been an important design technique in tuning the performance of a circuit. The most popular design criteria considered in transistor sizing includes area, delay and power. To ensure that transistor sizing is proceeding toward an optimal result, the relationship between these design criteria and transistor size must be addressed.

In the popular Elmore delay model, the delay of a MOS circuit is computed by the RC time constant. The values of resistance R and capacitance C can be extracted from the elements in a circuit. A MOS transistor is modeled as a switch. This switch is controlled by the voltage at the gate. When the switch is on, there is a resistance R between source and drain. In addition, there are capacitances on three terminals: drain, source and gate. Both conducting resistance and capacitance can be controlled by changing the widths of the transistors.

In digital design, the delay of a MOS circuit is determined by the delay of the critical path, which can be computed from the summation of the delays of stages along this path (each stage is separated by the gate of a MOS transistor), as represented by Equation 1 (EQ 1):

$$DELAY_{path} \sum_{i \in path} (R_i \times C_i) \quad (EQ\ 1)$$

$R_i$ is the conducting resistance of the transistor along the path that drives node i. $C_i$ is the node capacitance of node i. For a transistor, the conducting resistance is inversely proportional to the width of the transistor gate while the terminal capacitance is proportional to the width of the gate. Increasing the transistor width can reduce the resistance of this transistor, and thus reduce the delay of this stage. However, it also increases the loading capacitance of the previous stage, which increases the delay of the previous stage.

Regarding power, Equation 2 (EQ 2) is widely adopted in estimating the power consumption of a circuit:

$$Power = Vdd^2 X f x \sum_i (p_i \times C_i) \quad (EQ\ 2)$$

Vdd is the power supply voltage, f is the clock frequency, and $P_i$ is the toggling probability of node i in a clock cycle (i.e., $P_i$ indicates probability of a delay in a particular gate toggling from one logic state to another due to the delay of an input). With respect to capacitance, it seems straightforward that reducing the transistor sizes can reduce the power. However, since toggling probability heavily depends on the transistor delays, reducing capacitance alone does not necessarily reduce the power. In addition, Equation 2 only considers the charging/discharging power consumed in the capacitors. It does not capture the DC leakage and short-circuit power, which is significant for some types of circuits.

Equations 1 and 2 represent simplified models of circuit delay and power consumption. Although simplified, these models illustrate the non-trivial nature of determining optimal sizes of transistors in order to minimize delay and power.

Most previous transistor autosizers focus on reducing transistor delay and area. (See, for example, J. Fishburn et al., "TILOS: A Posynomial Programming Approach to Transistor Sizing," *Proceedings of the International Conference on Computer-Aided Design*, pages 326–328 (1985) ("Fishburn"); K. Hedlund, "Electrical Optimization of PLAs," *Proceedings of the Design Automation Conference*, pages 681–687 (June 1985); A. E. Ruehli et al., "Analytical Power/Timing Optimization Technique for Digital System," *Proceedings of the Design Automation Conference*, pages 142–146 (June 1977); and U.S. Pat. No. 4,827,428 issued to Dunlop et al. Some approaches use area as a first-order estimation for power. Due to the correlation between delay and power, however, reducing area does not necessarily reduce the power.

Early transistor autosizers typically rely on heuristic approaches. However, due to poor efficiency, some of these approaches can only focus on the delay of a few critical paths rather than the whole circuit.

As an improvement to these early autosizers, the transistor sizing problem has been formulated as a posynomial programming problem based on a simplified delay model. Fishburn. Posynomial programming, a subfield of convex programming, includes the advantageous property of convexity, which guarantees that a local minimum is also a global minimum. However, due to the intractability of posynomial programming, a heuristic approximation has been proposed. Instead of determining the sizes of all the transistors simultaneously, this approximation only changes the size of one transistor each time. It first computes the delay sensitivity with respect to the transistor sizes, and then selects the most sensitive transistor to resize.

A problem with this approach is that resizing one transistor each time is very inefficient, especially when many transistors must be resized. Another problem is that posynomial programming always starts from the circuit having the smallest size. However, the smallest size circuit is not necessarily the best starting point. Moreover, the heuristic approximation will cause deviations from the optimal solution when the optimal solution is far from the starting point.

To guarantee an optimal solution, a true convex programming approach for transistor sizing is proposed. See, S. Sapatnekar et al., "An Exact Solution to the Transistor Sizing Problem for CMOS Circuits Using Convex Optimization," *IEEE Transactions on Computer-Aided Design*, pages 1621–1634, Vol. 12 (11) (November 1993).

However, the intractability of convex programming makes it difficult to apply to large circuits and complex device models.

To overcome the efficiency and convergence problems of convex programming, a linear programming approach has been proposed. M. Berkelaar et al., "Computing the Entire Active Area/Power Consumption versus Delay Trade-Off Curve for Gate Sizing with a Piecewise Linear Simulator," *Proceedings of the International Conference on Computer-Aided Design,* pages 474–480 (November 1994). This approach represents design criteria in terms of linear equations and constraints as linear inequalities. A problem with this approach is that the delay and power of a transistor is not ideally a linear equation of its size. Modifications to this approach that ignore nonlinear effects and incorporate piecewise linear approximation have been proposed. These modifications will decrease precision and increase the number of constraints.

Another problem with linear programming is numerical instability which typically appears when the problem size grows (in terms of the number of variables and constraints).

In summary, previous approaches for transistor autosizing suffer from a variety of drawbacks including the consideration of only a limited number of design criteria (i.e., delay and area); use of inefficient heuristic methodologies or approximations; intractability of certain types of programming; convergence problems of posynomial programming when used with approximations; inaccuracy of linear programming approximations; and the inherent instability of linear programming when applied to a large number of variables and constraints. The detrimental impact of these drawbacks is enhanced when autosizing is applied to deep sub-micron semiconductor technology.

Accordingly, a new method for transistor sizing is required that captures circuit effects ignored by previous approaches, efficiently and reliably calculates optimal transistor sizes and allows for easier control of the optimization process.

SUMMARY OF THE INVENTION

The present invention provides methods for minimizing circuit delay and power consumption through a controlled, iterative process.

In a preferred embodiment, a system of the present invention uses a timing or delay analyzer and power simulator. The delay analyzer is a static delay analysis tool that searches the worst case delay from each input node to each output node. The power simulator is a dynamic power simulation tool that simulates circuit operation at the transistor level.

In one aspect of the present invention, a method of minimizing signal delay and power consumption of a circuit that includes circuit paths constructed from transistors and nodes includes the steps of: determining a time delay of each path in the circuit, wherein a time delay of greatest value is associated with a critical path of the circuit; selecting a first transistor, the first transistor residing in a first path in the circuit having a first time delay; sizing up the first transistor when the first time delay normalized to the time delay of greatest value exceeds a predetermined threshold value; and sizing down the first transistor when the first time delay normalized to the time delay of greatest value is less than the predetermined threshold value.

Other features and advantages of the present invention will become apparent upon a perusal of the remaining portions of the specification and drawings. In the drawings, like reference numerals indicate identical or functionally similar elements.

BRIEF DESCRIPTION OF THE DRAWINGS

FIGS. 7*a*–7*c* illustrate data structures of netlist transistors and nodes;

FIGS. 11*c* and 11*d* is source code illustrating calculation of scale_up, scale_down and threshold values;

FIG. 12 shows pseudo code describing initial determination of ratio value;

FIG. 13 shows pseudo code describing an adjustment of ratio value based on nodal switching activity;

FIG. 14 shows pseudo code describing stop_check operation;

FIG. 15 shows pseudo code describing the estimation of extra capacitance at a particular node for wiring load;

FIGS. 20–24 are execution reports for five different execution modes;

DESCRIPTION OF THE PREFERRED EMBODIMENT

Contents

I. APPARATUS
II. OPERATION
   A. System Overview
   B. Netlist Files

C. Stimulus File
D. Technology File
E. Configuration File
F. Transistor Autosizing Engine
    1. Initial Search and Select
    2. Run Core
        a. Power Simulation
        b. Delay Analysis
        c. Transistor Resizer
    3. Stop Check
    4. Output
G. Cell Selection
H. Wiring Capacitance
I. Functionality

I. APPARATUS

Figure 1:
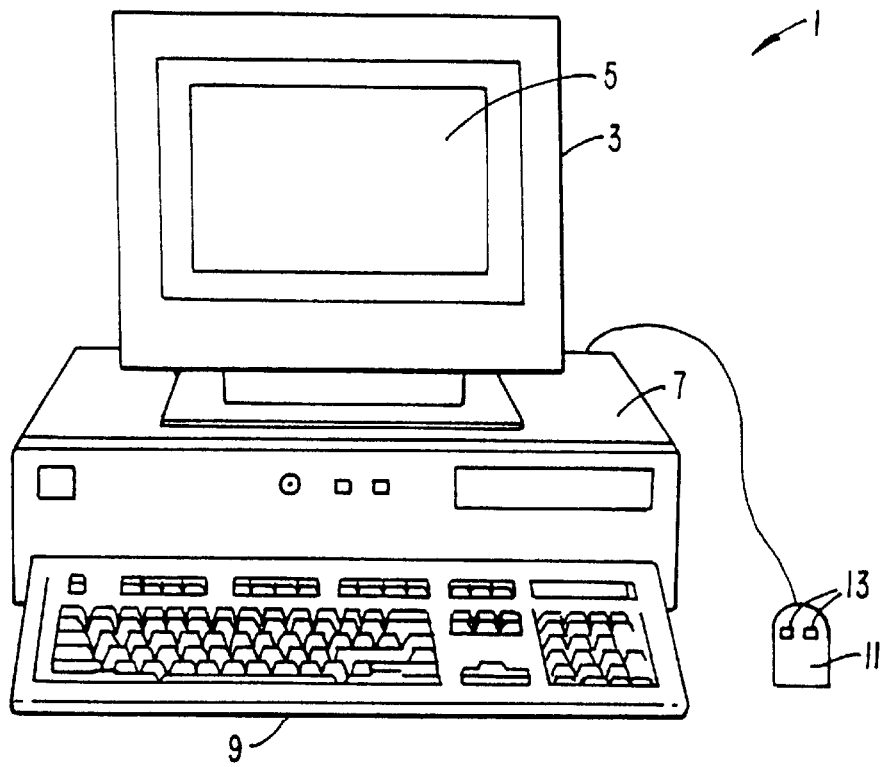
FIG. 1 is an illustration of computer hardware suitable for implementing the present invention.

FIG. 1 is an illustration of computer hardware suitable for implementing the present invention. FIG. 1 includes a transistor autosizing system 1 having monitor 3, display screen 5, housing 7, keyboard 9 and mouse 11. Mouse 11 may have one or more mouse buttons such as button 13. Housing 7 encloses typical computer components such as a processor, memory, disk drives and peripheral interface adaptor (not shown).

Transistor autosizing system 1 is shown embodied in one type of computer system. The particular computer system shown is representative only. Other types of computer systems suitable for use in the present invention include so-called "notebook," "palmtop" or "hand-held," "patent top," etc., computers. Further, the use of the term "mouse" or "user input device" is understood to include other means for inputting information into a computer such as a touch screen, track ball, MIDI keyboard, light pen, data glove, etc. It will be readily apparent to one of ordinary skill in the art that many types of computer hardware, and configurations of the hardware, are suitable for use in conjunction with the present invention.

Figure 2:
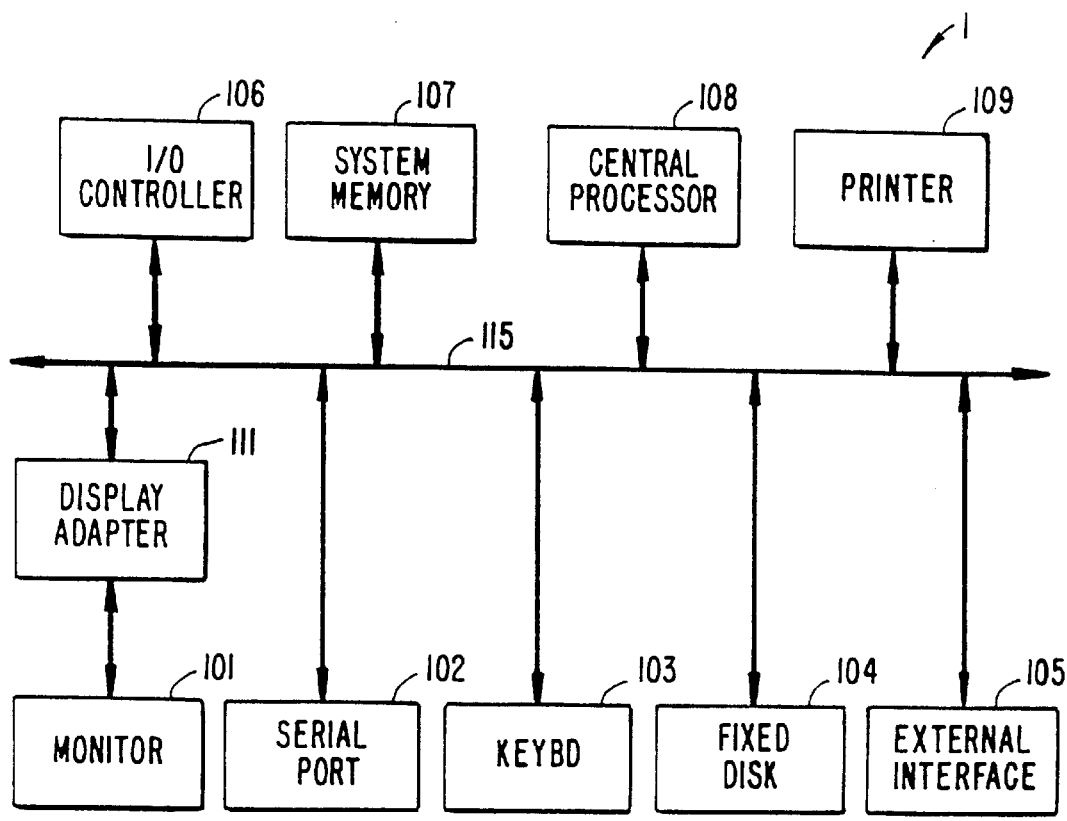
FIG. 2 is a transistor autosizing system for implementing transistor autosizing using a computer system.

FIG. 2 is a transistor autosizing system 1 for implementing transistor autosizing of electrical circuits. Transistor autosizing system 1 includes a central processor 108, a system memory 107, an input device, for example a keyboard 103, a fixed disk 104, a monitor 101, an external interface 105, a printer 109, an input/output (I/O) controller 106, a communications port 102, and a display adapter 111. A system bus 115 connects the components of computer system 150, providing a link among them. The keyboard 103 is a data entry device with which a user interacts with the transistor autosizing system 1.

The preferred embodiment of the invention is written using the "C" language, and runs on UNIX™-based engineering workstations such as SUN4, IBM RS6000, HP 700 series, and DECStations. Conforming to the ANSI standard on the "C" language, it can be readily rehosted on any UNIX-based computers with a standard "C" compiler. The flow charts of FIGS. 3–4, 6 and 11, pseudo code in FIGS. 12–14 and code in FIG. 15 describe operations implemented by the central processor 108 under appropriate process control and instruction from procedures stored in the system memory 107 provided as a part of transistor autosizing system 1.

Fixed disk 104 holds a variety of files (including netlists, stimulus, technology, and configuration) as well as transistor autosizing system executable binary code and translator spice2e, all of which are described below.

It will be apparent to those of skill in the art that the transistor autosizing system 1 could be readily applied on any one of a variety of workstations in any one of a variety of programming languages without departing from the scope of the invention. The above-described hardware/language are merely illustrative.

II. OPERATION

A. System Overview

Figure 3:
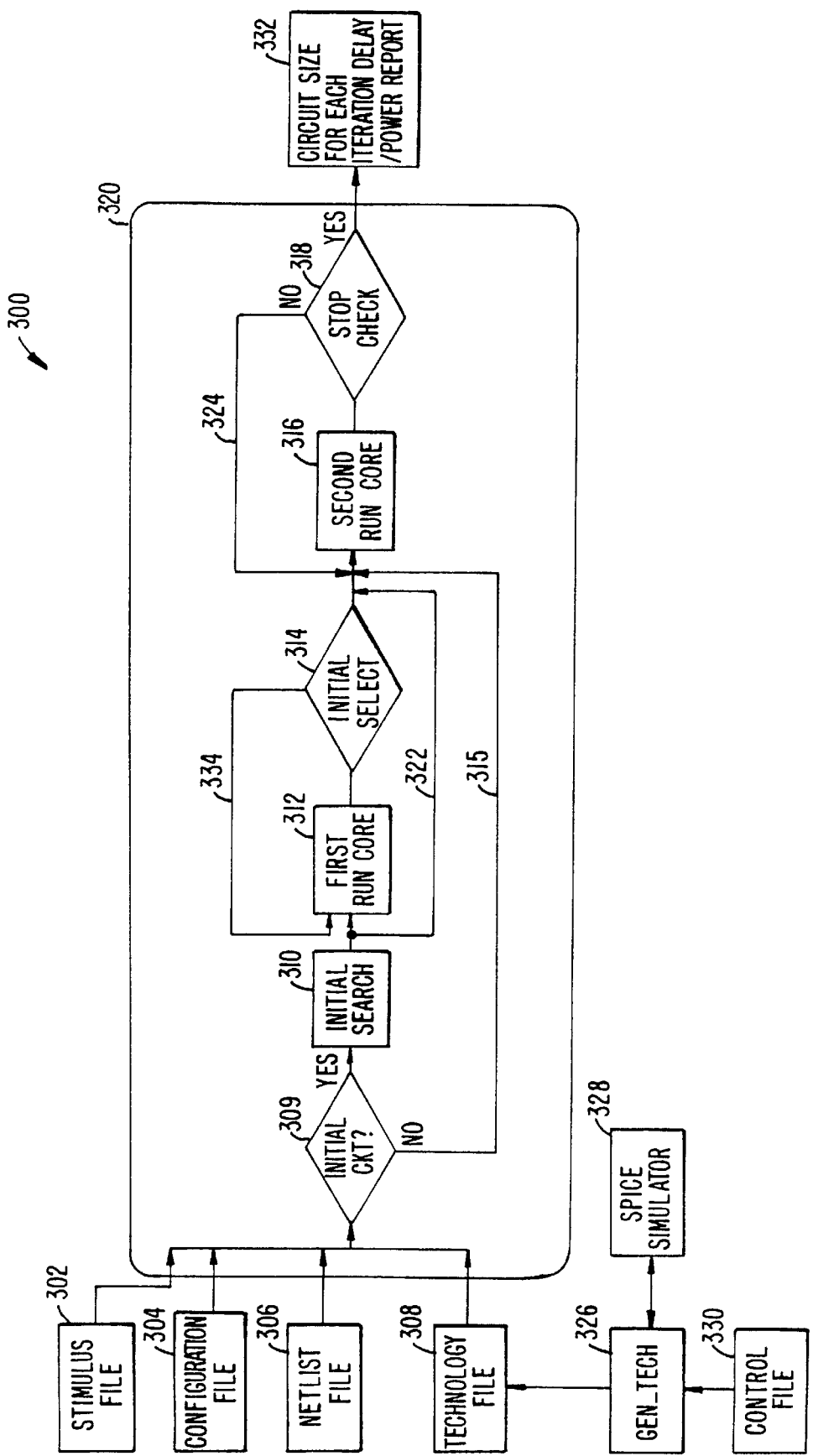
FIG. 3 is a flow chart describing a preferred process for transistor autosizing according to the present invention.

FIG. 3 illustrates a top-level flow chart 300 of a preferred process for transistor autosizing according to the present invention. Referring to FIG. 3, system 1 receives netlist file 306 describing a circuit, stimulus file 302 containing input vectors that describe logic waveforms for input nodes, technology file 308 containing piece-wise linear tables modeling a particular MOS process at a given temperature, and configuration file 304 specifying run time options (e.g., design constraints, initial searching commands and design goals). This information is forwarded to transistor autosizing engine 320.

Block 309 of engine 320 determines whether netlist 306 is being input for the first time (i.e., an initial circuit) or is being repeatedly input to support an iterative resizing operation in second run-core block 316 (discussed below). If it is the latter, the netlist is forwarded directly to block 316 via line 315. Otherwise, the netlist is forwarded to block 310 to undergo initial search and selection.

The initial "search and select" operation of engine 320 is represented by initial search block 310, first run-core block 312 and initial select block 314. In block 310, up to two circuits (in addition to the original input circuit) may be derived from the netlist file 306 with varying transistor sizes. These three circuits (original and two derivations) are then forwarded to first run-core block 312 which generates, among other things, a delay and power report for each circuit. (A more detailed illustration of run-core blocks 312 and 316 is provided in FIGS. 4a and 4b, discussed below.) Based at least in part on this delay and/or power information, initial select block 314 typically chooses the optimal candidate (from the initial three circuits presented) as the starting circuit. However, select block 314 may derive an alternative circuit based on different transistor sizes if the three circuits presented exhibit poor performance and an improved alternative is readily apparent. In this case the alternative circuit is returned to block 314 via line 334 for delay and power analysis. After which, iterative processing is initiated to achieve specified design goals. Initial searching can save a considerable amount of time if the initial design is far from the optimal design.

Alternatively, a user may specify a particular starting point and skip the search and select operation, as indicated by line 322.

Upon selecting a starting point in select block 314, the chosen circuit is forwarded to second run-core block 316 which generates, among other things, new transistor sizes, delay and power reports (although second run core block 316 generates no delay/power reports on any circuit that has already passed through block 312 since this information is already available). This information is forwarded to stop-check block 318 which compares the generated information with design constraints and goals held in configuration file 304. If one or more design goals are not met, the circuit is returned to second run-core block 316 via line 324 and the transistor autosizing process is repeated. This iterative process continues until all design goals are met or a maximum number of iterations are processed. At which point, stop check block 318 outputs autosizing results. These results include transistor sizes for each iteration and associated delay and power values. An example of transistor autosizing output directed to delay and power values is illustrated in FIGS. 20–24, described in more detail below.

Figure 4A:
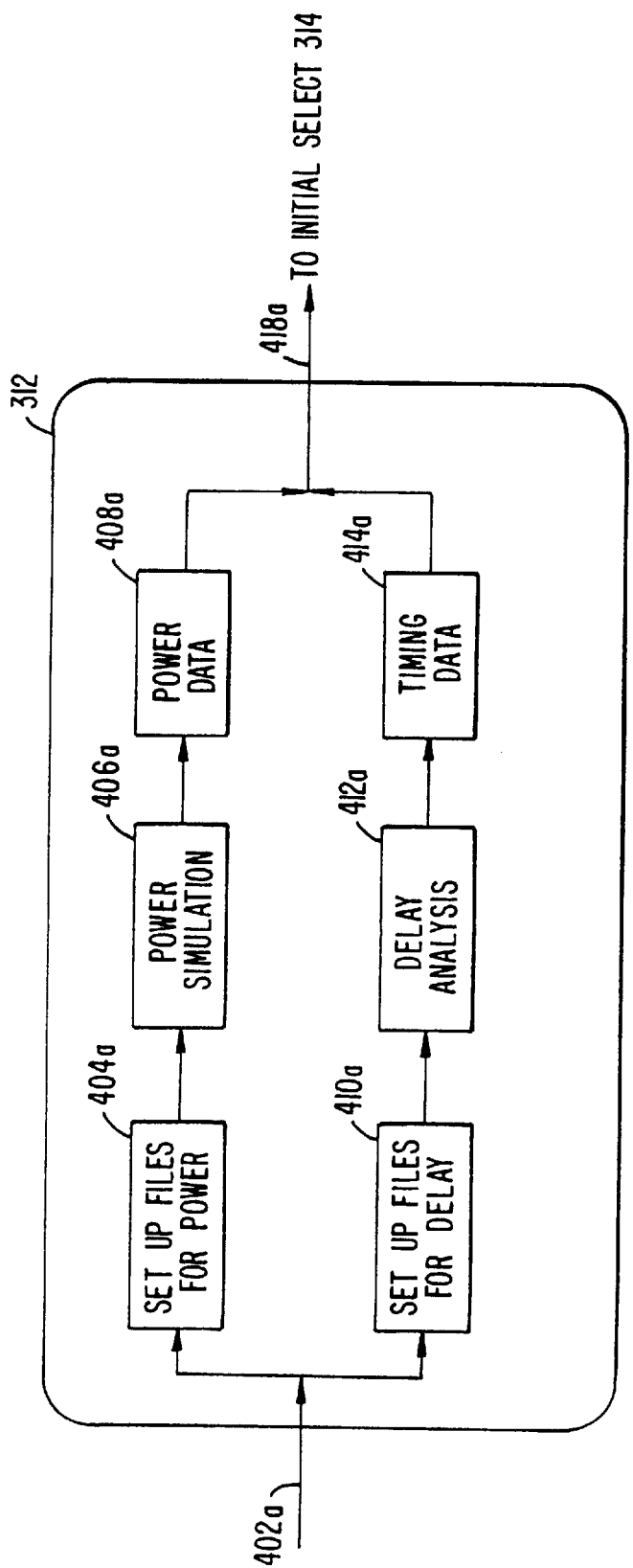
FIG. 4*a* is a flow chart describing operation of a first run core block.

FIG. 4a illustrates a flow chart for first run-core block 312. In brief, a netlist is input on line 402a initiating parallel power simulation and delay analysis. Power simulation requires that any control files (i.e., configuration files) be established in block 404a and power simulation be performed in block 406a. The output of this simulation 408a (i.e., circuit current, toggling activity for each node, identification of nodes with slow rise/fall time and identification of circuit paths coupling power and ground (dc_path)) is forwarded to initial select block 314 (FIG. 3) for purposes of selecting an initial circuit.

Delay analysis requires that any control files (i.e., configuration files) be established in block 410a and delay analysis be performed in block 412a. The output of this analysis 414a (i.e., critical path delay, critical slack information and driving/loading conditions of each transistor) is also forwarded to initial select block 314 (FIG. 3) for purposes of selecting an initial circuit. Power simulation, delay analysis and selection of an initial circuit is discussed in greater detail below.

Figure 4B:
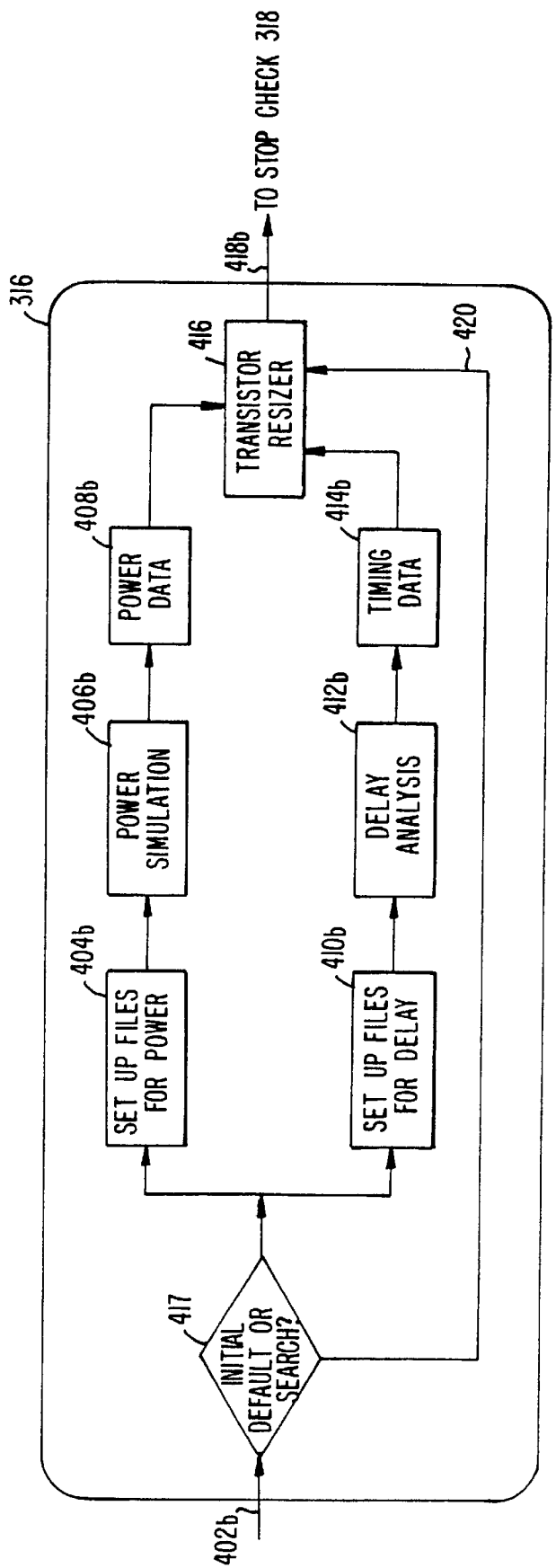
FIG. 4*b* is a flow chart describing operation of a second run core block.

FIG. 4b illustrates a flow chart for second run-core block 316. In brief, block 316 functions the same as block 312 with respect to operations 404b–414b (which correspond directly to 404a–414a). However, block 316 also includes a transistor resizer block 416 and decision block 417 coupled to bypass line 420. Resizer block 416 processes the information provided by power simulator block 406b and delay analysis block 412b to generate new transistor sizes for the next iteration. These transistor sizes are output on line 418b. Transistor resizing is discussed in greater detail below.

Decision block 417 directs an initial circuit selected from initial searching modes "default" or "search" (discussed below) and associated power/timing data produced in block 312 on to bypass line 420. This information is forwarded directly to transistor resizer 416 since power simulation and delay analysis has already been performed in run-core block 312.

Source code for one embodiment of the invention is included herewith as a Paper Appendix. Table 1 identifies select routines included in the attached Appendix:

TABLE 1

| File Name | Purpose |
| --- | --- |
| amps. c: | |
| init_search | initial search and select |
| run_core | run core function |
| select c: | |
| select_start | select initial circuit |
| path_amps. c: | |
| resize | transistor resizer |
| ps_adapt | modify scale-up, scale-down and threshold |
| fix_rf | calculate new ratios based on slow rise/fall times |
| output_stw | output operation |
| a_misc. c: | |
| check_stop | stop check operations |
| a_cell. c: | |
| cell_core | cell selection operation |

B. Netlist Files

Netlist file 306 defines the circuit to be analyzed; it is constructed from system elements connected by input and output nodes to form a network. The wire connections between elements are referred to as "nets." The system connectivity is established through the common input, output, and biput I/O nodes among the circuit elements. An element can be a single transistor, resistor, capacitor, gate, register, functional model, stimulus function, global timing error function or output probing function.

A conventional netlist file will include element and attribute identifiers. Element identifiers specify the type of function being defined (i.e., element library function, node function, input and output signals), while attribute identifiers indicate the input/output pins, internal state information, and any properties associated with the element. The netlist file may also include capacitance specifications applied to particular nodes, and subcircuit specifications (i.e., collections of elements).

Circuits formatted in a foreign netlist format such as the SPICE (S-P-I-C-E) format should be translated into a native format for transistor autosizing engine 320. Spice2e, a conventional translator utility analogous to Spice2t, converts SPICE netlists into a format preferred by engine 320. Additional discussion regarding the conversion of netlist files is provided in co-pending U.S. patent application Ser. No. 08/040,531.

C. Stimulus File

Stimulus file 302 contains input data used to stimulate the autosized circuit in transistor autosizing engine 320. The data or stimuli contained in file 302 may be in a variety of formats, including conventional test vectors, simulated clock input, constant period vector stimulus specification (stimulus signals to be applied at fixed time intervals) and logical one and zero constants.

D. Technology File

Technology file 308 is a data file containing user-specified MOS parameters and SPICE generated characteristics (i.e., Vgs, Vds v. Ids) to create piece-wise linear MOS models for circuit simulation and analysis. Referring to FIG. 3, technology file 308 is created by gen_tech 326, a utility which accesses data from control file 330 and interfaces directly with SPICE simulator 328 (running HSPICE, Pspice, PRECISE, SPECTRE, SPICE2, SPICE3 or SPECTRE2). The utility submits and invokes all the SPICE runs necessary to characterize CMOS technologies.

Control file 330 is divided into six sections: (1) typical_case_model, (2) parameter, (3) corner, (4) lib, (5) invoke, and (6) options. The typical_case_model section contains MOS transistor models for SPICE. The model parameters for both p and n channel transistor models are listed in this section. The "parameter" section includes values for a plurality of parameters which are identified in Table 2. The "corner" section specifies the voltage and temperature conditions for the process corner that the present technology file accounts for. The "lib" section allows the user to specify a SPICE model library to be used when running gen_tech 326. The "invoke" section contains the user-specified command that invokes SPICE in the simulated environment. Finally, the "options" section contains the user-specified SPICE options that would normally appear in an .OPTIONS statement in a SPICE format. A description of the .OPTIONS statement is provided in P. W. Tuinenga, *SPICE: A Guide to Circuit Simulation & Analysis Using PSpice*, Prentice Hall (1992), which is hereby incorporated by reference in its entirety for all purposes.

TABLE 2

| Parameter | Definition |
| --- | --- |
| 1. body_bias | The sampling source voltage values at which the body bias effects are measured. Maximum number of sampling voltages is five. |
| 2. pn_ratio | The typical p-transistor width to n-transistor width ratio used to insure that inverters have equal rise and fall intrinsic delays. |
| 3. NW | A set of typical transistor widths used in calibrations. |
| 4. n_length | The typical channel length of the n-transistor. Maximum number of lengths is ten. |
| 5. p_length | The typical channel length of the p-transistor. Maximum number of lengths is ten. |
| 6. ds_length | The typical drain-source extension. The dimension is used in conjunction with transistor widths to determine the drain and source area and perimeter for drain source diffusion capacitance estimations during simulation, if such geometries are not provided. (Listed in the technology file as diffext.) |
| 7. ldiff/wdiff | Used to explicitly specify the lateral diffusion for transistor widths and lengths. The present invention uses these to calculate the effective width and length of each transistor where:<br>Leffective = Ldrawn−2*ldiff<br>Weffective = Wdrawn−2*wdiff<br>Two numbers are associated with each variable representing NMOS and PMOS lateral diffusions. If these options are not used, gen_tech extracts the lateral diffusion by running SPICE. |
| 8. vds/vgs | Drain to source and effective gate to source voltage ranges and their incremental values are specified for calibrating device currents. |
| 9. thresholdmos | Specifies the zero bias threshold voltage. Typically, this is read from the SPICE model parameter VTO. If it is desired to override this parameter, or adjust it with respect to temperature, or the parameter is missing from the SPICE model, this variable can be used to specify the threshold voltage. |
| 10. vto | Species the threshold voltage for a transistor at nominal temperature. The threshold voltage is used to calculate the body bias effect. |

A more detailed discussion related to the technology file may be found in U.S. patent application Ser. No. 08/040, 531. Additional discussion may be found in the following publications generated by Epic Design Technology, Inc., located at 2901 Tasman Drive, Suite 212, Santa Clara, Calif.: *EPIC Tools User Manual* 3.1 (July 1994) and *Powermill User Manual* 3.1 (July 1994) both of which are hereby incorporated by reference in their entirety for all purposes.

E. Configuration File

Configuration file 304 contains information (i.e., configuration commands) used to tailor setup and running conditions for transistor autosizing engine 320. (As discussed below, this file may also be used by power simulator 406 and/or delay analyzer 412 (FIG. 4).)

There are four types of configuration commands used by transistor autosizing engine 320: "design constraints," "initial searching," "design goals" and "miscellaneous." (In the argument part of a configuration command, the following legends are used: f: floating number; i: integer; and c: character. These values are provided by the user.)

"Design constraints" commands define physical characteristics of the subject transistors and include the following:

max_tx_size f: the upper bound of transistor size, unit is micron (default is 100).
 min_tx_size f: the lower bound of transistor size, unit is micron (default is 1).
 grid_size f: the grid(incremental) for tx size, unit is micron (default is 0.01).

"Initial searching" commands force certain limitations to the initial search of a circuit. As a default, transistor autosizing engine 320 (FIG. 3) will initially search three circuits (in blocks 310–314): the original (i.e., input) circuit, the original circuit proportionally scaled down to the smallest size ("default scaling circuit"), and the original circuit with all transistors at the smallest size ("default changing circuit"). However, initial searching commands "search" and "init" can alter this operation, as described below:

search f f: Force the size in auto-searching. As mentioned above, transistor autosizing engine 320 (FIG. 3) will search the original circuit, the smallest scaled-down circuit and the smallest circuit as a default. The "search" command, however, can force engine 320 to search a specific size rather than the smallest ones. The first number specifies the scaling factor, the second one specifies the absolute size.

For example, "search 2.2 11" will direct engine 320 to search the original circuit, the original circuit enlarged by a ratio of 2.2 ("user-specified scaling circuit"), and the original circuit with all transistors having the same width of 11 um ("user-specified changing circuit").

In addition, rather than performing multiple searches at the beginning, users can specify a particular starting circuit by invoking the "init" command: init c f:specify the initial point. This command is further described in Table 3.

TABLE 3

Init Command

| Value of "c" in init c f | Operation |
| --- | --- |
| "c" | All the transistors ("txs") are changed to the same size of f micron. |
| "s" | All the txs are scaled by the same factor f. |
| "i" | The original circuit -- this option does not need f argument. (Note: If there are touch/no_touch nodes (described below), then the initial point can only be the original circuit.) |

"Design goals" commands facilitate three execution modes of the transistor autosizing engine 320: requirement mode, cost-function mode and slack-driven mode (default is cost-function mode).

In requirement mode, two requirement parameters may be specified: delay and power. If the delay requirement is specified (delay requirement mode), engine 320 will first satisfy the specified delay and then minimize the power. Conversely, if the power requirement is specified (power requirement mode), engine 320 will first satisfy the specified power and then minimize the delay. If both delay and power requirements are specified, the latter will overwrite the former. In other words, the last requirement command in the procedure will be executed and all previous requirement commands will be ignored. The related configuration commands are:

delay_req f: f is a floating number, unit is ns.

power_req f: f is a floating number, unit is mW.

In cost-function mode, the user can define the cost in terms of the sum or product of three criteria: power (p), delay (d) and area (a). The relative weight can be specified by coefficients for the sum or the exponents for the product. The p, d and a values have no units, they are ratios normalize to the power, delay and area of the initial circuit. The related configuration command is: cost_fx+|* [fc fc fc:]. This command is further described in Table 4 (where * and ^ signify multiplication and exponent, respectively):

TABLE 4

Cost function command

| Cost Function Command (Example) | Arithmetic Operation |
|---|---|
| cost_fx + 1p 2d 3a | cost = p + 2*d + 3*a. |
| cost_fx + 2d | cost = p + 2*d + a (default coefficient or exponent values are 1) |
| cost-fx * .5a 2d 1p | cost = p * d^2 * a^.5 |

In slack-driven mode, the goal is to make the slack values positive. Slack value may be defined as the difference between the required output time for a specific signal (from a particular transistor) and the actual arrival time, as shown in equation 3:

$$\text{Slack value} = (\text{Required output time}) - (\text{Actual arrival time}) \quad (\text{EQ 3})$$

A positive slack value indicates the timing constraints of a circuit are satisfied while a negative value indicates these constraints are violated and transistor resizing is required. In a simple combinational circuit, the slack constraint is applied to the input/output of the total circuit based upon the longest path. However, in a sequential circuit the timing becomes more complicated because memory devices (i.e., flip flops) subject to other timing constraints (i.e., different clock(s)) may be included in a particular path. As such, slack analysis must account for the timing requirements at each clock-controlled device. To account for these multiple requirements, a number of individual slack values along a path (such as at each node) are measured and then summed to calculate the total slack value for a particular path. The slack mode is specified by the following command: slack.

Once the slack values for all signals in a circuit become positive, engine 320 will try to minimize power. Slack-driven mode differs from delay-requirement mode in the sense that the input signals can have different arrival times and output signals can have different required times. In this mode, the user needs to specify the timing constraints through the configuration command. For example:

```
slack
source_node    i1    i2    delay=0   ;i1, i2 arrive time 0
sink_node            o1    delay=5   ;o1 is required at time 5
sink_node            o2    delay=7   ;o2 is required at time 7
```

In this case, two signals are anticipated to arrive at nodes i1 and i2 at time 0. One signal must be output to node o1 no later than time 5 while the other signal must be output to node o2 no later than time 7. Assuming these signals arrive on time, the slack for o1 is 5 and for o2 is 7.

If more than one execution mode is specified, the last execution mode specified will be executed; all previous requests will be ignored. Should no mode be specified, transistor autosizing engine 320 (FIG. 3) will default to cost-mode, with a cost function of: p*d*a.

As noted above, transistor autosizing engine 320 also uses a set of "miscellaneous" configuration commands to more specifically control the transistor sizing operation. These commands are briefly described below.

1. wire_cap_est {on/off}:

This command turns on and off an estimation for wire delays. If no argument is specified, the command defaults to "on." For example, "wire_cap_est off" turns off the wire estimation so there is no extra capacitance at each node to account for the wiring load. The estimation formula (described below) takes into account the number of input/output pins and the area of elements connected to the nodes (i.e., the larger the elements and the more connecting pins the longer the wires).

2. node_switch {on/off}:

This command turns on and off a node switching "weight" in transistor sizing. If no argument is specified, the command defaults to "on." By turning this option on, node switching activities will be taken into account during transistor sizing. That is, the transistors connected to a highly switching node will be kept smaller to reduce the power consumption at that node (default is "on"). (Note: If the power simulation is not very comprehensive, it is better to turn this option off to avoid bias switching information.)

3. size_level {gate/pn}:

This command resizes the transistor at the "pseudo-gate" level. The pseudo-gates are defined from the transistor netlist as all transistors that are channel-connected to each other. (This definition is a little different from conventional gates if pass transistors and transmission gates are present.)

Figure 5:
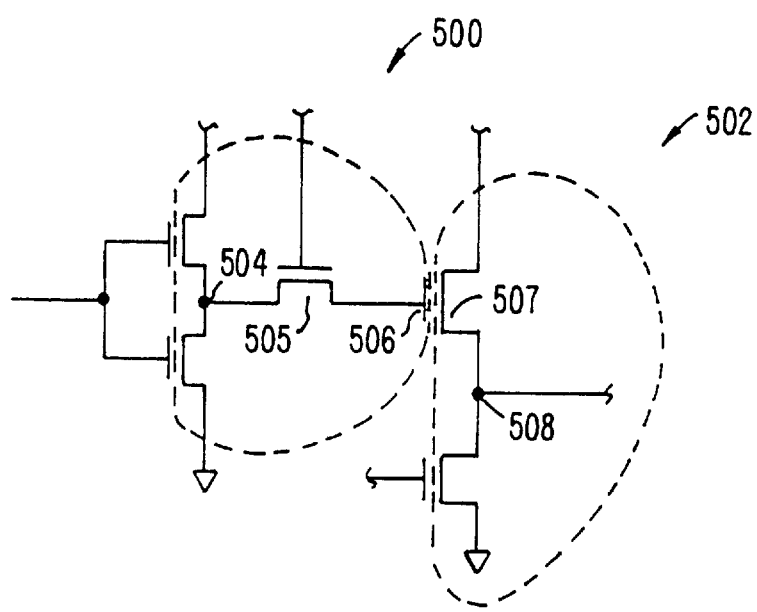
FIG. 5 illustrates the concept of channel-connected transistors.

More specifically, channel-connected transistors represent a set of nodes and transistors interconnected through transistor channels. As illustrated in FIG. 5, nodes 504 and 506 are included in channel-connected-transistor set 500, interconnected via the channel of transistor 505. Conversely, node 508 is included in channel-connected-transistor set 502, separated from set 500 by the gate of transistor 507. A more detailed discussion of channel-connected transistors is provided in U.S. patent application Ser. No. 08/040,531.

When the argument of the size_level command is "gate," the transistors inside a gate will be resized all together by the same ratio. However, when the argument is "pn," the p transistors inside a gate will be resized all together by the same ratio, and the n transistors inside the gate will be resized by the another ratio. When this command is absent from the configuration file, transistor resizing occurs at the transistor level.

4. rf_fix f:

This command turns on rise/fall time fixing and specifies the threshold for rise/fall time. The nodes with rise/fall time longer than f ns will be checked and fixed.

The significance of this command is drawn from the fact that power consumption has two parts: dynamic power and static power. Static power consumption refers to the power consumed by the DC standby current. Dynamic power represents the power consumed by the dynamic transition. This part can be further divided into two components; switching power and transient short-circuit power. The first component is due to the charging and discharging of the capacitive nodes while the second component is due to the short-circuit (i.e., leakage) current between Vdd and ground during transitions. Switching power is proportional to the capacitances, which can be reduced by decreasing the width of the transistors.

Figure 25:
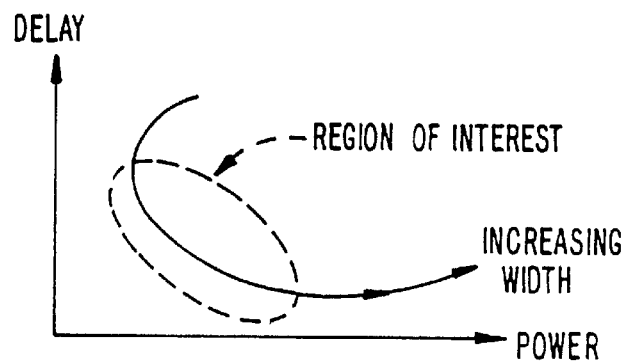
FIG. 25 is a graph illustrating the combined effects of transistor widths on delay and power.
Figure 26:
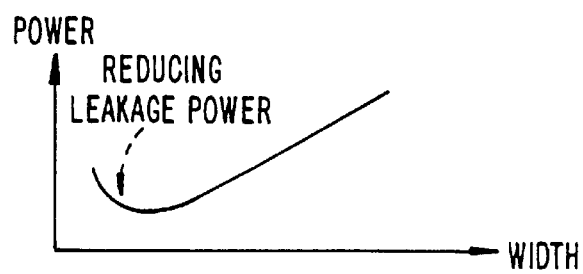
FIG. 26 is a graph showing the effects of leakage power on total power consumption as a function of transistor width.

Since short-circuit current is related to the transition time of the transistor, reducing the rise/fall time can improve the leakage power. Using information generated from power simulation (see below), problematic nodes with slow rise/fall time can be located. The pull-up or pull-down transistors which drive these nodes may then be sized up to reduce both power and delay. As shown in FIG. 26, a circuit with minimal size does not necessarily consumes less power due to the significant percentage of leakage power. FIG. 25 shows the combined effects of transistor widths on delay and power. The rf_fix command is discussed below.

5. max_loop i:

This command specifies the maximum number of iterations (default is 10).

6. degrade_thresh f:

This command sets the threshold for degrading in delay or power. The iteration will exit when delay or power values degrade more than f from the previous iteration (default value is 0.4).

F. Transistor Autosizing Engine

As briefly described above, FIG. 3 provides a top-level flow chart 300 of transistor autosizing engine 320. Each of the components illustrated in FIG. 3 are discussed in greater detail below.

1. Initial Search and Select

Initial search and select is carried out through initial search block 310, first run-core block 312 and initial select block 314 shown in FIG. 3. Unless instructed otherwise, transistor autosizing engine 320 retrieves a circuit from netlist files 306 and creates two modified versions to perform searching operations. One modified circuit is proportionally scaled down to the smallest transistor size. The other modified circuit sets all transistors to the smallest size allowable.

For example, if a retrieved circuit has two elements with widths 5 µm and 8 µm, and the allowed minimal size for the transistors is 1 µm, then engine 320 will simulate the original circuit (widths: 5,8), the scaled down circuit (widths: 1, 1.6) and the smallest size circuit (widths: 1,1).

Searching for the smaller circuits is performed as a default if the user does not specify transistor sizes for the initial circuit. The user can also specify a different set of searching circuits by the "search" command, described above. If the user already knows that the initial circuit is very close to the smallest size and the delay requirement is critical, then it is better to force engine 320 to search larger circuits to improve efficiency.

Figure 6:
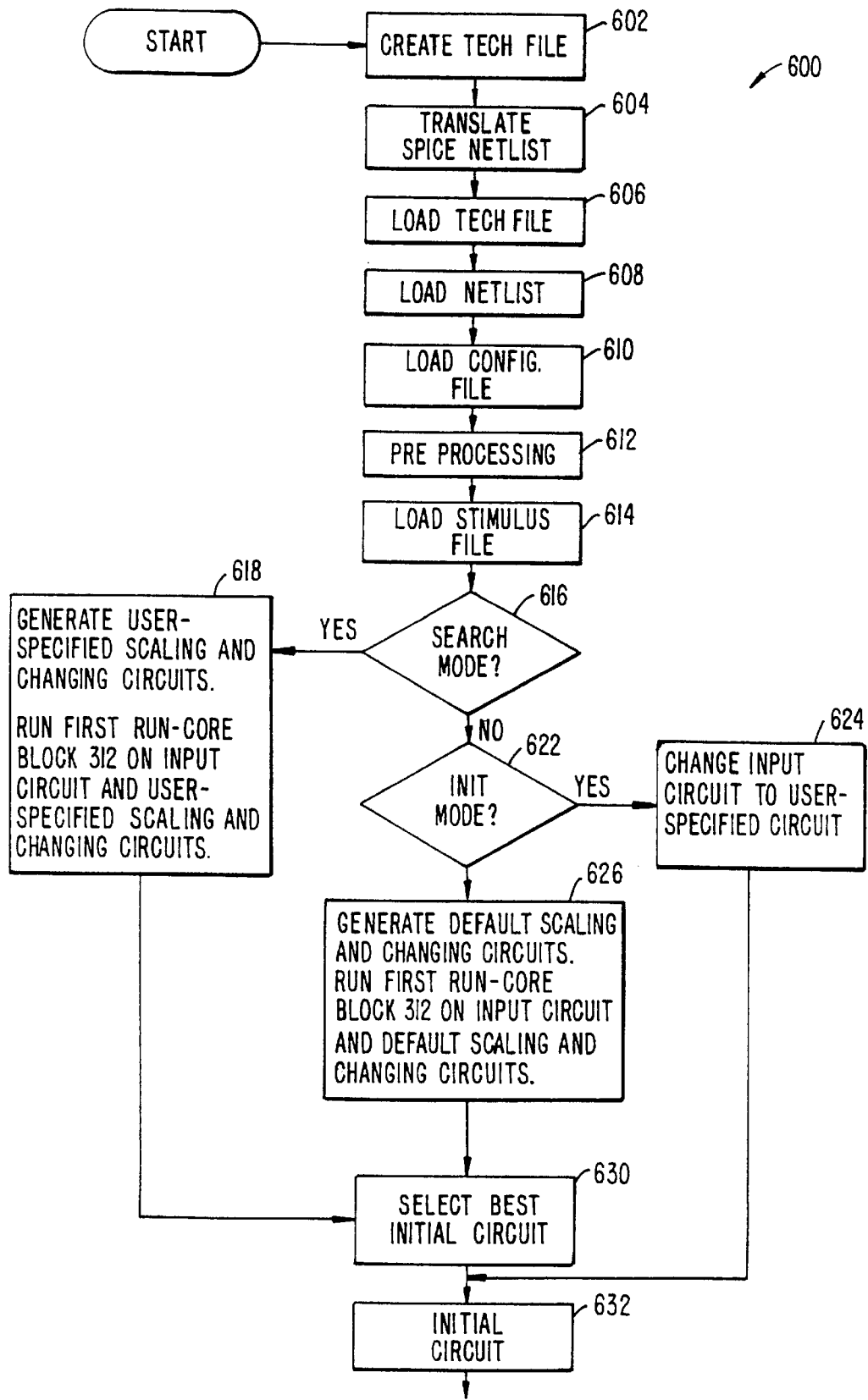
FIG. 6 and FIGS. 6*a*–6*d* are flow charts describing initial circuit search and select operation.

Referring to FIG. 6, the initial search procedure is described in detail in flow chart 600. In block 602, prior to initial searching, a technology file is created. In block 604, a SPICE netlist is translated into transistor autosizing engine format via spice2e. The technology file and netlist are then loaded into system memory 107 (FIG. 2) in blocks 606 and 608. Additionally, a configuration file is loaded into system memory 107 in block 610, containing configuration commands that control transistor autosizing (i.e., initial searching, etc.) and define user requirements (i.e., design constraints), as described above.

After these files are loaded, operation proceeds to preprocessing block 612. During preprocessing, netlist files 306 (FIG. 3) are accessed and data structures are built associating parameters with and identifying interrelationships between circuit elements.

Figure 7A:
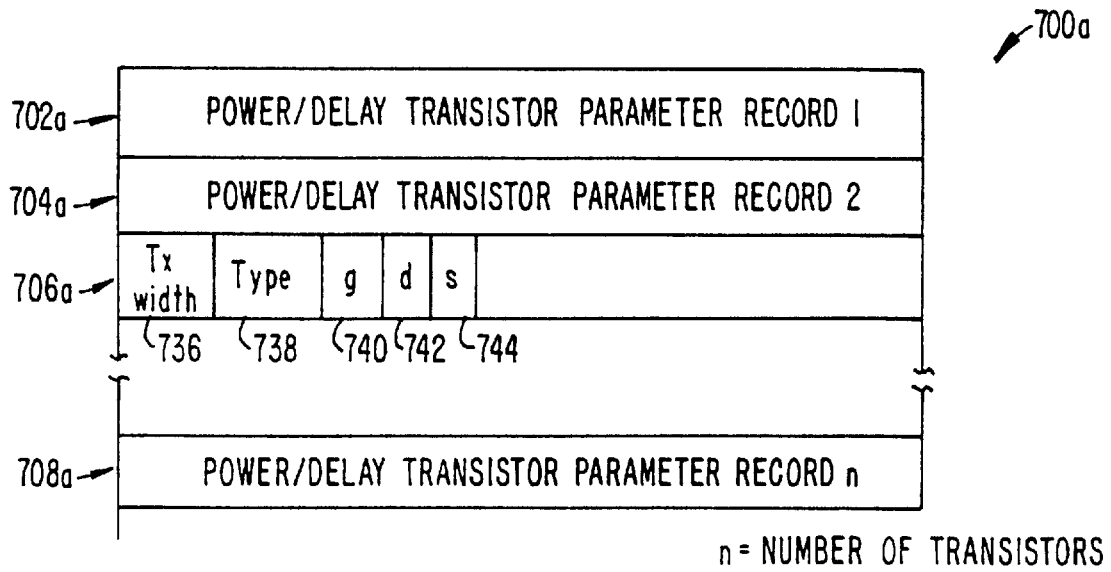
Figure 7B:
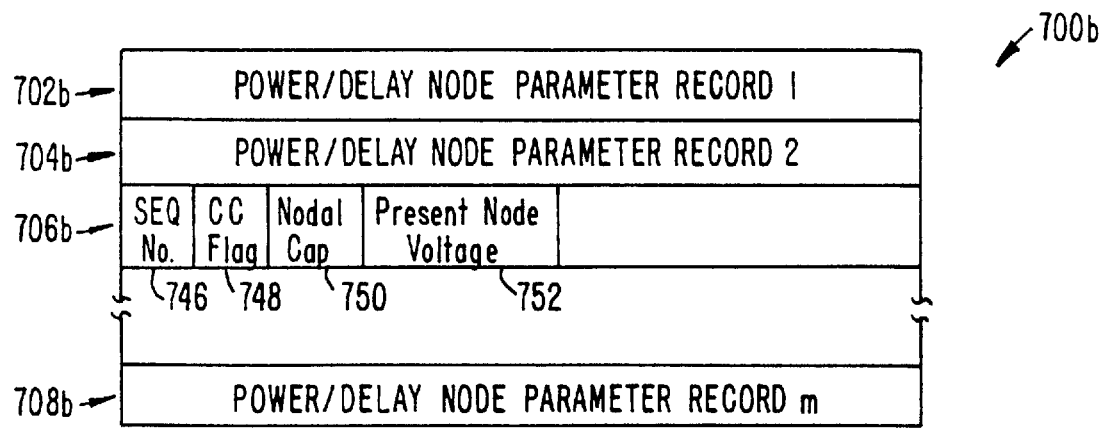

For example, as shown in FIG. 7a, transistor data structures are constructed from an array of transistor parameter records (i.e., 702a–708a). Each transistor parameter record is associated with a particular transistor and contains a variety of fields, such as transistor width 736; transistor type (i.e., p or n) 738; identification of source 744, drain 742 and gate 740 terminal nodes, etc. Similarly, as shown in FIG. 7b, data structures containing an array of nodal parameter records are created for netlist nodes (i.e, 702b–708b). Each nodal parameter record contains a variety of fields, such as a sequential number (unique number assigned to each node) 746; a flag indicating membership within a set of channel-connected transistors 748; total nodal capacitance 750; present nodal voltage 752; etc. Such data structures are accessed during power simulation (406a or 406b) and delay analysis (412a or 412b) for carrying out power simulations and timing analysis. A more detailed discussion of such data structures used by a particular power simulator is provided in U.S. patent application Ser. No. 08/040,531.

Figure 7C:
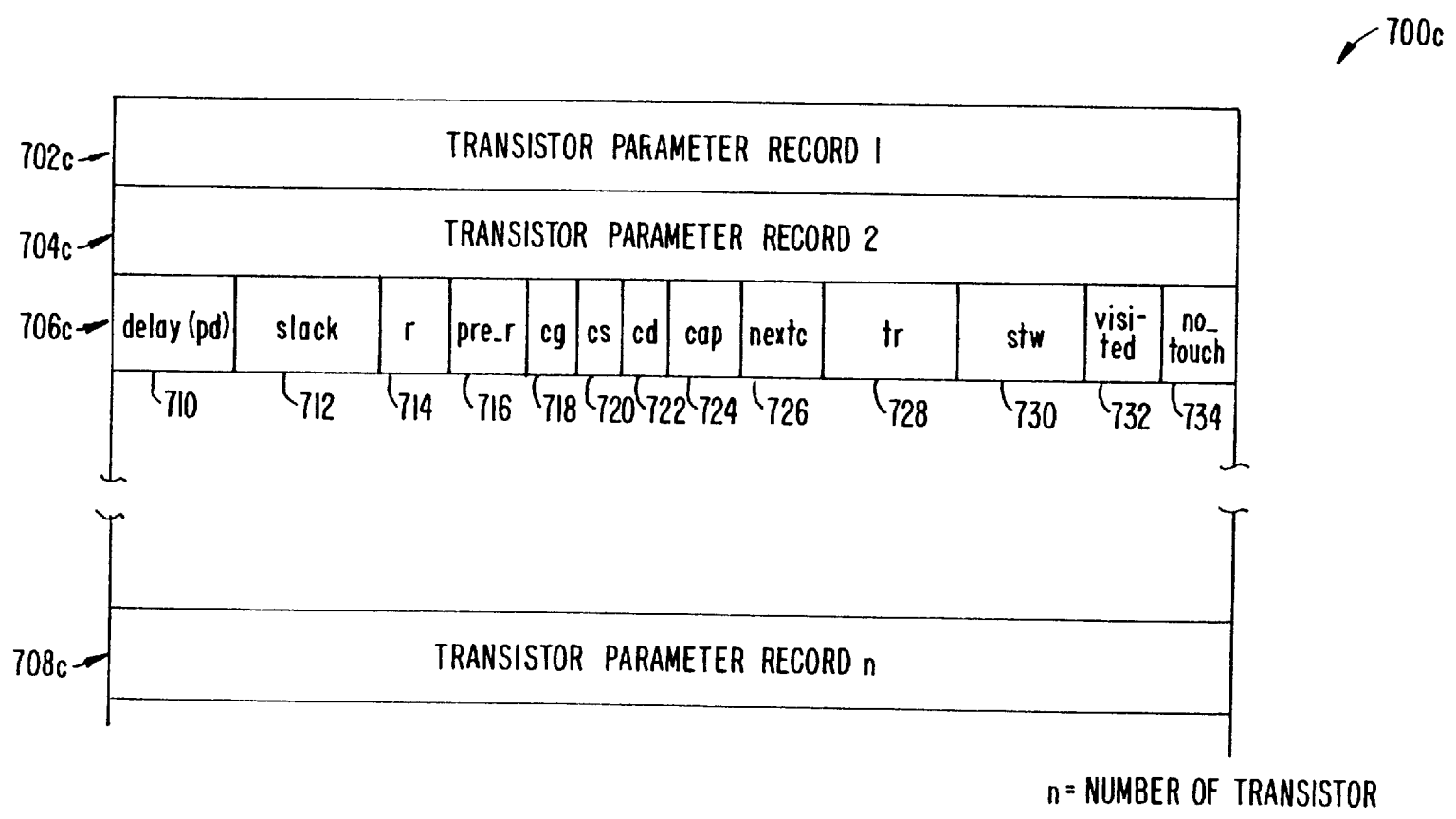

In addition to data structures for power simulator 406 and delay analyzer 412, an analogous data structure is generated for transistor resizer 416. Referring to FIG. 7c, transistor data structure 700c is constructed from an array of transistor parameter records 702c, 704c, 706c and 708c. Each transistor parameter record is associated with a single transistor and includes fields shown in FIG. 7c and described in Table 5; i.e., delay 710, slack 712, r 714, pre_r 716, cg 718, cs 720, cd 722, cap 724, nextc 726, tr 728, stw 730, visited 732 and no_touch 734. The significance of some of these fields is discussed in greater detail below.

TABLE 5

Transistor Parameters for Transistor Resizing

| | | |
|---|---|---|
| 1. | delay: | Delay of path on which transistor resides (path_delay). |
| 2. | slack: | Slack of path (path slack). |
| 3. | r: | Resistance of transistor. |
| 4. | pre_r: | Resistance of previous transistor. |
| 5. | cg, cs, cd: | Capacitance of three terminals of transistor. |
| 6. | cap, nextc: | Capacitance of transistor and capacitance of load. |
| 7. | tr: | Toggling rate. |
| 8. | stw: | Ratio for new transistor size. |
| 9. | visited:1: | Indicates whether transistor has already been resized in the current iteration. |
| 10. | no_touch:1: | Enables user to exclude transistor from resizing operation. (Transistor autosizing engine 320 (FIG. 3) will evaluate every transistor in a given circuit for resizing in accordance with the operation discussed herein. However, if the no_touch bit for a particular transistor is set (by the user), this transistor is excluded from consideration and remains unchanged.) |

After completing preprocessing, stimulus file 302 (FIG. 3) is loaded into system memory 107 in block 614, and initial searching begins. In decision block 616, a configuration file (loaded in block 610) is checked for the "search" configuration command. If present, transistor autosizing engine 320 (FIG. 3) generates user-specified scaling and changing circuits (defined above) in block 618 by modifying the transistor width for each transistor in the input circuit. These width modifications are held in the transistor parameter records for power simulation and delay analysis (i.e., FIG. 7a).

For each circuit under consideration (i.e., original, scaling and changing) in block 618, first run-core block 312 performs power simulation and delay analysis (see FIG. 4a). The resulting information is then used to select the "best" initial circuit in block 630 subject to the configuration commands in file 304 (e.g., "design goals" and "design constraints" commands). Selection is controlled by the "design goals" commands in configuration file 304.

If the search mode is not selected, the configuration file is checked for the "init" configuration command in decision block 622. If present, transistor autosizing engine 320 (FIG. 3) modifies the input circuit in block 624 by modifying a transistor width parameter held in associated transistor parameter records for each transistor in the input circuit. This modification is controlled by the init command arguments (i.e., c, s or i), as described above. The modified circuit then becomes the initial circuit in block 632.

Finally, if neither "search" nor "init" are specified in the configuration file, transistor autosizing engine 320 generates the smallest scaling and changing circuits (i.e., "default scaling circuit" and "default changing circuit") in block 626. As described above, these variations of the input circuit are achieved by modifying the transistor width for each transistor in the input circuit.

For each circuit under consideration (i.e., original, default scaling and default changing) in block 626, first run-core block 312 performs power simulation and delay analysis (see FIG. 4a). The resulting information is then used to select the "best" initial circuit in block 630 subject to the configuration commands in file 304 (e.g., "design goals" and "design constraints" commands). Selection is controlled by the "design goals" commands in configuration file 304.

As mentioned above and illustrated in FIG. 6, when operating in search mode (block 618) or default mode (block 626), an initial circuit must be selected in block 630 from at least three candidates. This selection is controlled by the "design goals" commands, which provide for three execution modes: requirement mode, cost-function mode and slack-driven mode. In general, the circuit associated with the "best" size for the controlling execution mode is chosen as the initial circuit and forwarded to second run-core block 316 (FIG. 3) in block 632 (FIG. 6).

More specifically, in cost-function mode, the circuit with the least cost will be selected as the starting point. Typically, the selected circuit is one of the three provided in default or search mode (i.e., initial, scaling or changing circuit). However, in limited circumstances, engine 320 will not select one of these three circuits but rather will create another scaling or changing circuit where the potential for improvement is clear.

For example, the execution report provided in FIG. 23 shows the results of an initial circuit selection based on a cost function (defined by addition). The initial circuits were created in the default mode. Although the initial circuit has the lowest cost (i.e., 7.000), "auto select" chose "change 2.24" as the initial circuit because of the clear potential for an improved cost function. In this instance, the delay element of the cost function had a relatively large coefficient (i.e., 5.0) thereby weighting the significance of this element in the cost analysis. Since both the scaling circuit ("S") and changing circuit ("C") resulted in smaller circuits, each experienced greater delay which pushed their respective cost_fx values beyond that of the initial circuit ("Initial").

Moreover, since the total size of the initial circuit was relatively small (i.e., 20 um) when compared with the maximum limit (1800 um; i.e., 300 um×6 elements), there was significant excess capacity to enlarge the circuit and thereby reduce total delay. Accordingly, engine 320 changed the initial circuit to the uniform size of 2.24 um which reduced the cost function to a value below the initial circuit.

Figure 6A:
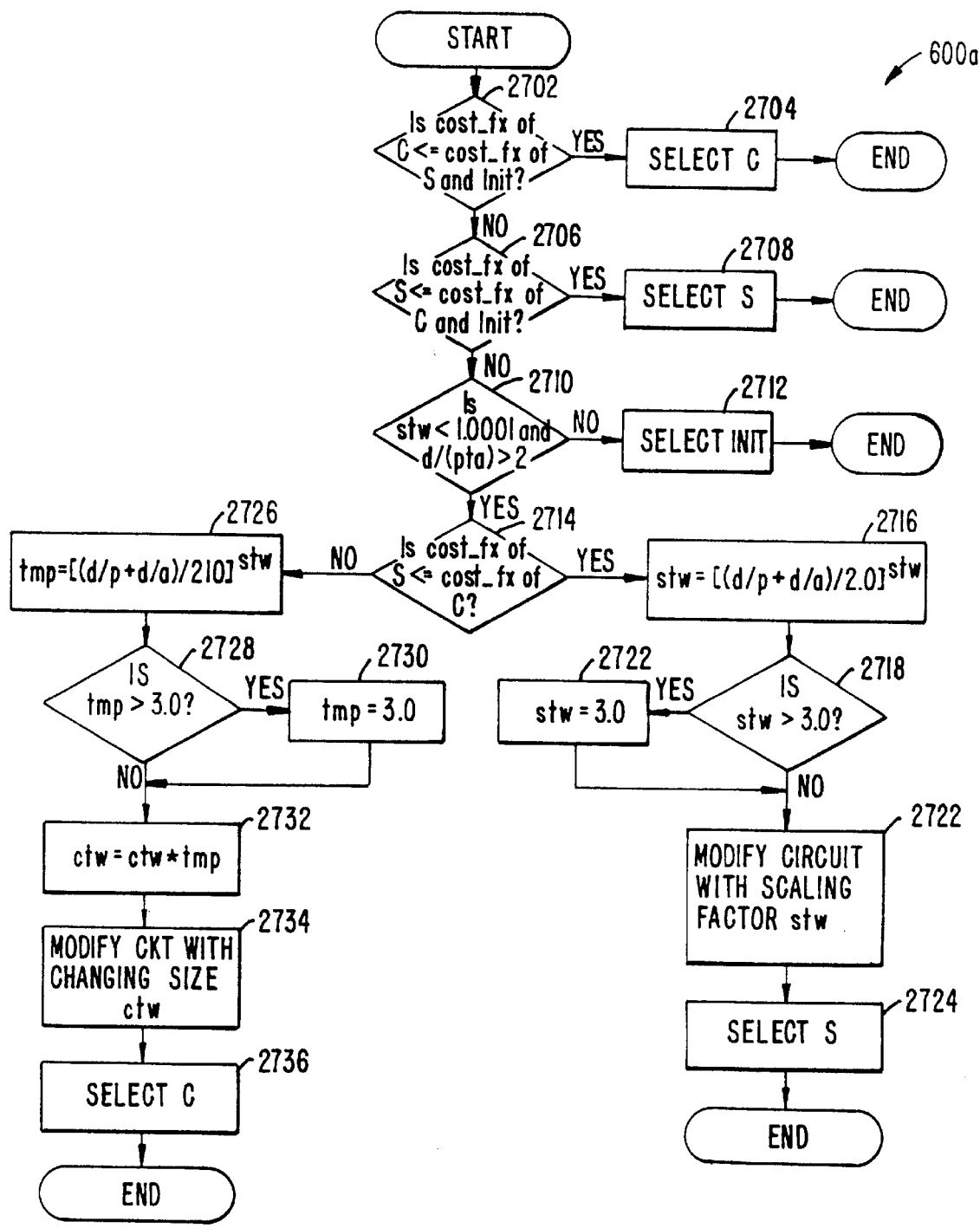

Selection of the initial circuit under cost-function mode is more clearly illustrated in flow chart 600a of FIG. 6a. Referring to FIG. 6a, in block 2702, it is determined whether the cost function (cost_fx) of changing circuit (C) is less than or equal to the cost function of scaling circuit (S) and initial circuit (INIT). If yes, the changing circuit is selected in block 2704. If no, it is determined whether the cost function of the scaling circuit is less than or equal to the cost function of the changing circuit and the initial circuit in block 2706. If yes, the scaling circuit is selected in block 2708. If no, control flows to block 2710 which determines whether the ratio or scaling factor (stw) is relatively small (i.e., less than 1.001) and whether the delay coefficient (d) is critical. The delay coefficient is deemed critical if this value (i.e., d) divided by the summation of the power coefficient (p) and area coefficient (a) is greater than 2. If no, the initial circuit is selected in block 2712. If yes, operation flows to block 2714 which determines whether the cost function of the scaling circuit is less than or equal to the cost function of the changing circuit. If yes, the calculations as shown in FIG. 6a are carried out in blocks 2716, 2718 and 2720 to produce a scaling factor (stw) no greater than 3.0. In block 2722, the initial circuit is modified by the newly calculated scaling factor stw thereby creating a new scaling circuit. Finally, in block 2724, the scaling circuit is selected as the initial circuit.

Otherwise, if the cost function of the scaling circuit is greater than that of the changing circuit, operation flows to block 2726. In blocks 2726 through 2730, a temporary value (tmp) is calculated which is no greater than 3.0. In block 2732, this temporary value is multiplied by ctw (the uniform transistor width for the changing circuit) thereby generating a new ctw value, thereby creating a new changing circuit. In block 2734, transistor widths in the initial circuit are changed to the ctw value thereby creating a new changing ckt. In block 2736, the changing circuit is selected as the initial circuit.

In requirement mode and slack-driven mode, one of the three circuits provided by search mode (block 618) or default mode (block 626) that is within a predetermined margin of the required criteria is typically selected to be the starting point. The predetermined margin is computed from the circuit size. The margin is inversely proportional to the circuit size.

For example, the execution report provided in FIG. 21 shows the results of an initial circuit selection based on the delay requirement mode. The initial circuits were created in the default mode. Although the initial circuit ("Initial") has the lowest delay, "auto select" chose "change 1.00" (i.e., the default changing circuit "C") as the initial circuit because it was in a predetermined margin of the required criteria (i.e., 4.0 ns) and had a clear potential for an improved delay. Other examples of initial searching selections are provided in FIGS. 20 and 22–24, discussed below.

Figures 6B, 6E:
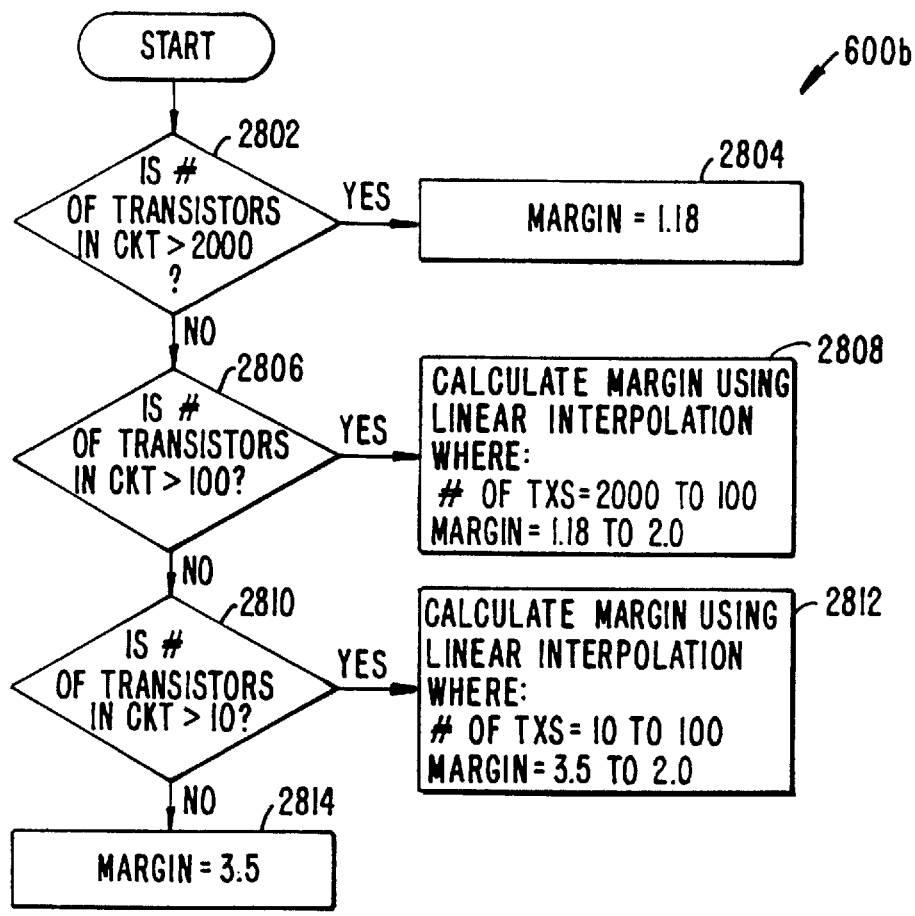
FIG. 6*e* is source code describing initial circuit search and selection for slack-driven mode.
Figure 6C:
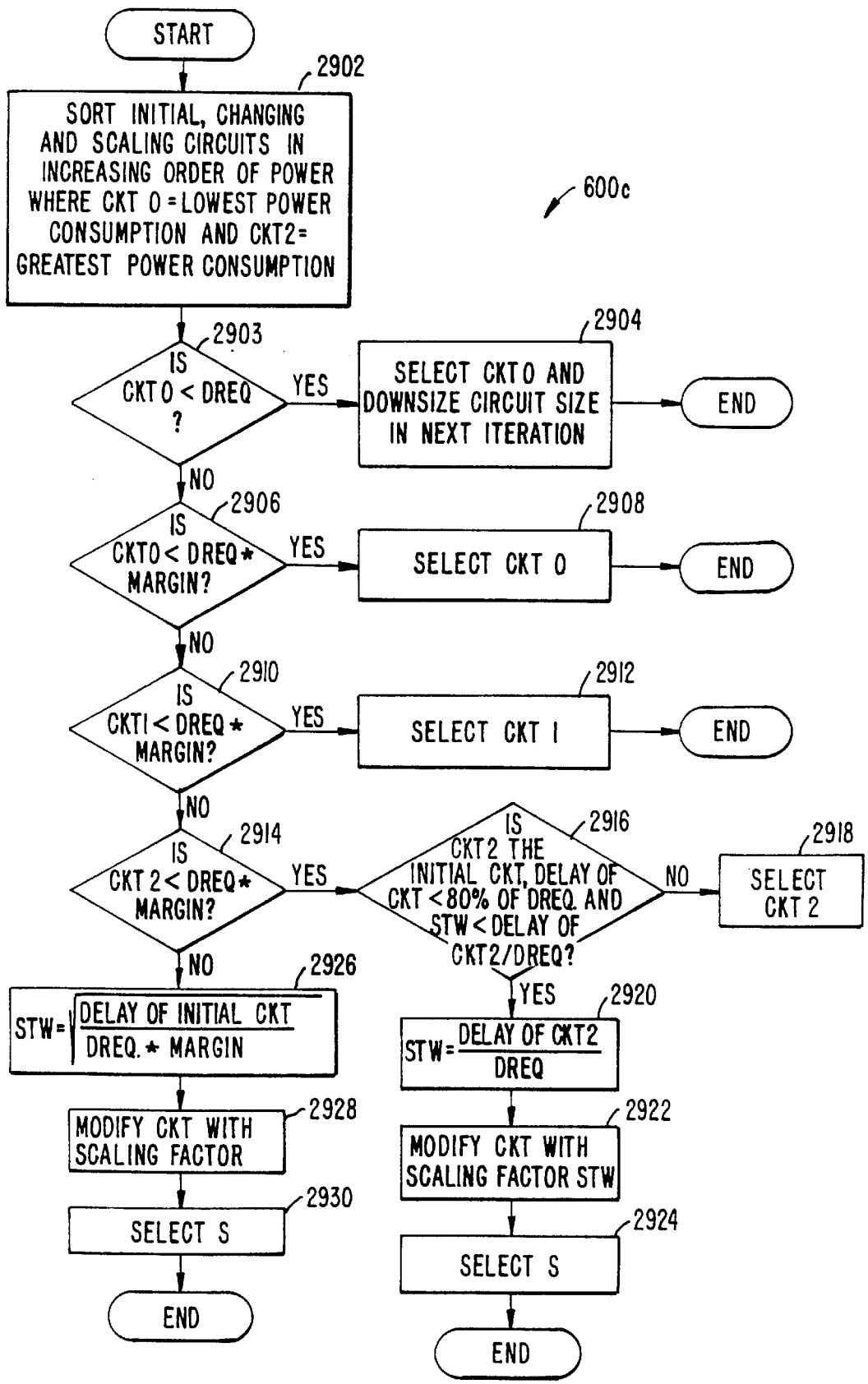
Figure 6D:
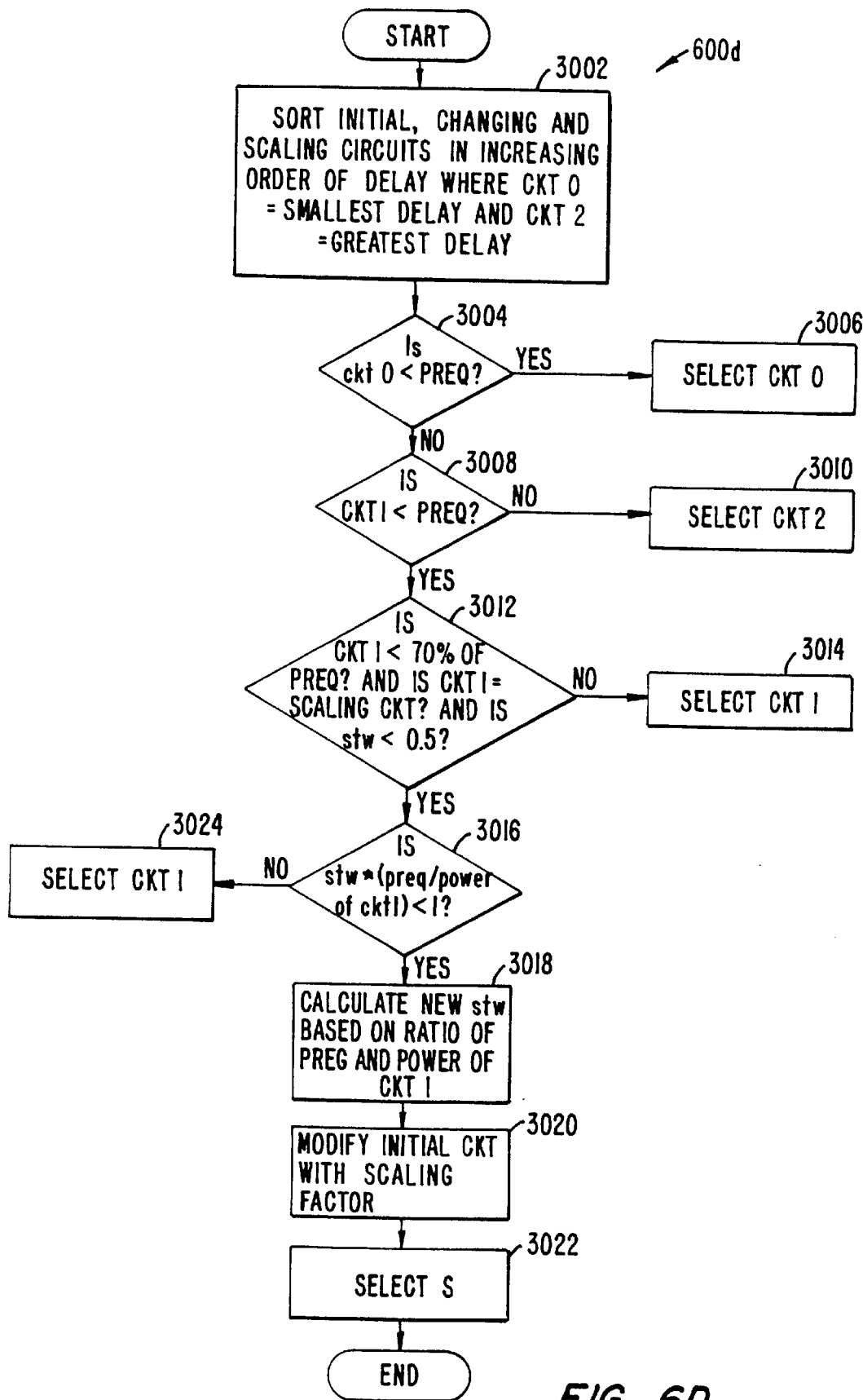

Selection of the initial circuit under requirement mode is more clearly illustrated in flow charts 600b, 600c and 600d of FIGS. 6b, 6c and 6d, respectively. Referring to FIG. 6b, flow charts 600b illustrates the calculation of the predetermined margin. In block 2802, it is determined whether the number of transistors in the subject circuit are greater than 2000. If yes, the predetermined margin equals 1.18. If no, operation flows to block 2806 which determines whether the number of transistors in the subject circuit are greater than 100. If yes, the margin is calculated using linear interpolation where the number of transistors ranges from 2000 to 100 and the margin value ranges from 1.18 to 2.0.

If the number of transistors in the circuit is not greater than 100, operation flows to block 2810 which determines whether the number of transistors in the subject circuit are greater than 10. If yes, the margin is calculated using linear interpolation where the number of transistors ranges from 10 to 100 and the margin value ranges from 3.5 to 2.0.

If the number of transistors in the subject circuit is less than or equal to 10, then the margin value is set at 3.5.

Flow chart 600c shown in FIG. 6c illustrates the selection of an initial circuit under delay requirement mode. In block 2902, initial, changing and scaling circuits are sorted in increasing orders of power consumption, where circuit 0 (ckt 0) identifies the circuit with lowest power consumption and circuit 2 (ckt 2) identifies the circuit with greatest power consumption. In block 2903, it is determined whether ckt 0 delay is less than the delay requirements set by the user (dreq). If yes, circuit 0 is selected and the subsequent iteration will downsize transistor width since the circuit with lowest power consumption satisfied the delay requirement at the outset.

If circuit 0 is not less than the delay requirements set by the user (dreq), operation flows to block 2906. In block 2906, it is determined whether circuit 0 delay is less than the product of dreq and margin (i.e., the margin value calculated in flow chart 600b). If yes, circuit 0 is selected as the initial circuit. If no, operation flows to block 2910.

In block 2910, it is determined whether the delay in circuit 1 is less than the product of dreq and margin. If yes, circuit 1 is selected as the initial circuit. If no, operation flows to block 2914.

In block 2914, it is determined whether the delay in circuit 2 is less than the product of dreq and margin. If yes, it is further determined in block 2916 whether (1) circuit 2 is the initial circuit, (2) the delay of circuit 2 is less than 80% of dreq, and (3) stw (i.e., ratio or scaling value) is less than the delay of circuit 2 divided by dreq. If no, circuit 2 is selected as the initial circuit. If yes, a new ratio value is calculated in block 2920 (i.e., stw equals delay of circuit 2 divided by dreq).

In block 2922, the initial circuit is modified with the new scaling factor calculated in block 2920 thereby creating a new scaling circuit. Finally, in block 2924, the new scaling circuit is selected as the initial circuit.

Alternatively, if the delay of circuit 2 is not less than the product of dreq and margin, then a new value of stw is calculated in block 2926. Operation then flows to block 2928 wherein the new value of stw is used to modify the initial circuit producing a new scaling circuit. This new scaling circuit is selected in block 2930 as the initial circuit.

Flow chart 600d in FIG. 6d illustrates the selection of an initial circuit in the power requirement mode. In block 3002, the initial, changing and scaling circuits are sorted in increasing orders of delay, where circuit 0 (ckt 0) represents the smallest delay of these three circuits and circuit 2 (ckt 2) represents the greatest delay of these three circuits. In block 3004, it is determined whether ckt 0 power is less than preq (power requirement set by user). If yes, ckt 0 is selected. If no, operation flows to block 3008 where it is determined whether ckt 1 power is less than preq. If no, circuit ckt 2 is selected in block 3010. If yes, it is further determined in block 3012 (1) whether circuit 1 is less than 70% of preq, (2) whether ckt 1 is the scaling circuit and (3) whether stw (i.e., the current ratio or scaling factor) is less than 0.5. If no, circuit 1 is selected in block 3014 as the initial circuit. If yes, the inequality of block 3016 is evaluated.

Referring to FIG. 6d, if decision block 3016 is no, circuit 1 is selected in block 3024. If yes, a new stw is calculated based on the ratio of preq and the power of circuit 1 in block 3018. (See source code Appendix; select_start in select.c.) In block 3020, the initial circuit is modified in accordance with the new stw value thereby generating a new scaling circuit. Finally, in block 3022, the scaling circuit newly calculated in block 3020 is selected as the initial circuit.

Finally, the selection of the initial circuit under slack-driven mode is shown in the source code provided in FIG. 6e. Referring to FIG. 6e, the variable "val" represents the critical slack value. If this value for the changing circuit is greater than −15, then the changing circuit is selected. Otherwise, if the critical slack value is greater than −10 for the scaling circuit, then the scaling circuit is selected. Otherwise, if the critical slack value for the initial circuit is greater than −10, then the initial circuit is selected. If none of these inequalities are satisfied, a new value of stw is calculated and this value is used to modify the initial circuit to thereby create a new scaling circuit. Thereafter, the scaling circuit is selected as the initial circuit.

Upon selecting an initial circuit in block 630 of FIG. 6, this circuit is forwarded to second run-core block 316 (FIG. 3) in block 632 (FIG. 6).

2. Run Core

FIGS. 4a and 4b illustrate first run core 312 and second run core 316 (FIG. 3), respectively. As noted above, the difference between run core 312 and run core 316 is the addition of transistor resizer 416 and bypass line 420 in run core 316. Since run core 316 encompasses all the features of run core 312, the following discussion will be directed to run core 316 (it being understood that any discussion directed to blocks 404b–415b applies equally to blocks 404a–415a, respectively).

a. Power Simulation

Block 404b sets up files for power simulator 406b. In the preferred embodiment of the present invention, power simulation block 406b is performed by the POWERMILL software available from EPIC Design Technology, Inc., 2901 Tasman Drive, Suite 212, Santa Clara, Calif. 95054. (However, many other commercially-available circuit simulators may be used in place of the POWERMILL software, some of which are identified below.) POWERMILL software receives a circuit (via netlists) and stimulus (input vectors) and simulates the circuit operation at the transistor level according to a I-V characteristics from technology files 308. After finishing the simulation, POWERMILL software reports detailed simulation results for diagnostics and debugging.

Should the POWERMILL software be used, the files set up in block 404b include a configuration file. The configuration commands used in power simulation differ from those used for transistor resizing. Power simulation configuration commands may be used to define general circuit parameters for proper execution, such as setting the power supply and ground nodes, establishing speed and accuracy control and defining capacitance values of certain nodes. In addition, more power-specific configuration commands can be utilized to specify high and low threshold voltages, report a power histogram and set different power supply voltages.

The power data 408b retrieved from power simulation block 406b include circuit current, toggling activity for each node (i.e., number of logic transitions during a given simulation), identification of nodes with slow rise/fall time and identification of circuit paths coupling power and ground nodes (dc_path).

Additional description of the POWERMILL software in connection with general operation and current calculation may be found in U.S. patent application Ser. No. 08/040,531. Additional description of the POWERMILL software in connection with identification of nodes with slow rise/fall time and identification of circuit paths coupling power and ground nodes (i.e., direct current path; "dc_path") may be found in U.S. patent application Ser. No. 08/231,207. Finally, an overall description of the POWERMILL software may be found in *Powermill User Manual* 3.1 Epic Design Technology, Inc. (July 1994) and Deng, *Power Analysis for CMOS/BiCMOS Circuits*, IWLPD '94 Workshop Proceedings, pages 3–8 (1994), both of which are hereby incorporated by reference in their entirety for all purposes.

Counting the number of logic transitions (i.e., toggles) occurring at each node in a circuit during a simulation may be achieved through a straightforward software routine that functions as a conventional counter. The use of a counter to tally the number of occurrences of a certain event is well-known to those having ordinary skill in the art and need not be described further.

In addition to the POWERMILL software, other commercially-available software may be used as power simulation block 406b to generate the output identified above. Suitable substitutes for the POWERMILL software include "HSPICE" from MetaSoftware (1300 White Oaks Road, Campbell, Calif. 95008); "PSPICE" from MicroSim (20 Fairbanks, Irvine, Calif. 92710); "PRECISE" from Electrical Engineering Software (1900 McCarthy Boulevard, Suite 310, Milpitas, Calif. 95035); "SPECTRE" and "SPECTRE II" from Cadence (555 River Oaks Parkway, Building 1, San Jose, Calif. 95134); and "SPICE2" and "SPICE3" from University of California at Berkeley (Berkeley, Calif. 94720).

b. Delay Analysis

Block 410b sets up files for delay analysis 412b. In the preferred embodiment of the present invention, delay analysis block 412b is performed by the PATHMILL software available from EPIC Design Technology, Inc., at the address noted above. (However, many other commercially-available delay analysis tools may be used in place of the PATHMILL software, some of which are identified below.) The PATHMILL software is a static delay analysis tool. It searches the worst case delay from each input node to each output node. This software uses the same technology core as the POWERMILL software. It can achieve transistor-level delay accuracy.

Should the PATHMILL software be used, the files set up in block 410b include a configuration file. The configuration commands used in delay analysis differ from those used in transistor resizing. Like power simulation, certain delay-analysis configuration commands are used to define general circuit parameters for proper execution, such as setting the power supply and ground nodes, establishing speed and accuracy control and defining capacitance values of certain nodes. In addition, more timing-specific configuration commands can be utilized to identify the clocking nodes; set the direction of certain circuit elements; specify the part of the circuit of interest, searching conditions and criteria; and identify what information should is desired.

The timing data 414b retrieved from delay analysis block 412b include path delays or path slack, each transistor driving condition (i.e., resistance of instant and previous transistor) and each transistor loading condition (i.e., capacitance of output node). Delay is broken down into the delay of each stage; i.e., a set of channel-connected transistors. The timing data 414b also identifies the critical path based on delay as well as slack.

Additional description of the PATHMILL software may be found in *PathMill User Manual* 3.1 EPIC Design Technology, Inc. (July 1994) and commonly-owned, co-pending patent application, Ser. No. 08/429,430 (Attorney Docket No. 015521-000900) filed May 1, 1995, and entitled "A Circuit Analyzer of Black, Gray And Transparent Elements," both of which are hereby incorporated by reference in their entirety for all purposes.

Suitable substitutes for the PATHMILL software capable of generating the necessary timing data 414b as described above include "DESIGN TIME" from Synopsys (700 E. Middlefield Road, Mountain View, Calif. 94043); "PEARL" from Cadence (555 River Oaks Parkway, Building 1, San Jose, Calif. 95134); "LSim" from Mentor Graphics Corporation (8005 SW Boeckman, Wilsonville, Oreg. 97070); and "MOTIVE" from Viewlogic (293 Boston Post Road West, Marlboro, Mass. 01572-4615). Further, once a critical path in a circuit is identified, the driving/loading conditions of the path may simply be retrieved from the netlist rather than through a particular application software.

c. Transistor Resizer

Detailed driving/loading conditions and nodal switching activity can be collected from power simulation block 406b and delay analysis block 412b in FIG. 4b. This information is used to decide the new sizes of the transistors by transistor resizer 416. The delay and power data is also useful in adjusting the resizing mechanism for the next iteration. During each iteration, power simulation block 406b and delay analysis block 412b are utilized to update power and timing information for the circuit undergoing transistor resizing.

Referring to FIG. 3, transistor autosizing engine 320 receives netlist file 306 describing a circuit at the transistor level. Transistor resizer 416 (FIG. 4b) can resize transistors at two levels: a gate level and an individual transistor level. Moreover, through the use of critical path information received from delay analysis 412b, resizer 416 effectively resizes transistors at a third level: the path level (with the granularity of a transistor).

Since the delay of a circuit is determined by the delay of the longest path, transistor resizer 416 can improve delay by modifying a small portion (i.e., path) of a circuit. From a more general point of view, only critical paths need to be shortened to improve the delay. The critical paths are the paths of which the delays are longer than a delay requirement (i.e., requirement set by the user). Different outputs can have different required times. Along the critical paths, the transistor sizes need to be increased. Increasing the transistor size can reduce the driving resistance, and therefore the delay of the critical paths. The new transistor sizes are computed from the criticality of the path, which is reflected by the path delay (or the slack value as discussed below).

Since some non-critical paths may drive the transistors on the critical paths, it is very likely that some originally non-critical paths will become critical after sizing up the transistors on the critical paths. In order to avoid deteriorating the delay of non-critical path too much, possible candidates for critical paths should also be addressed. These paths can be determined from the fanin of the critical path transistors and the path delays.

For the other transistors which are not on the critical paths nor the possible critical paths, the sizes should be reduced to save power. Additionally, this reduction may possibly reduce the load on the critical paths and therefore further reduce the delay of critical paths. A simple example is shown in FIG. 8.

Figure 8:
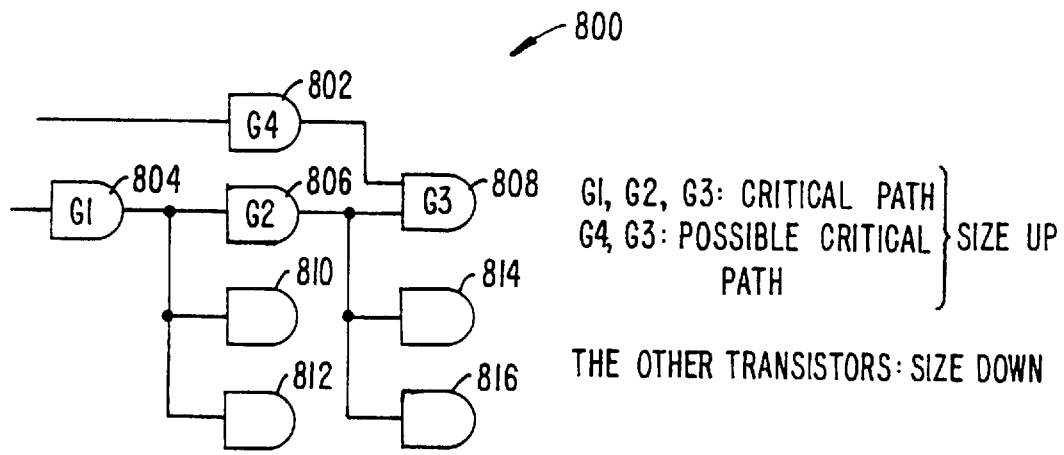
FIG. 8 illustrates transistor resizing on critical and possible critical paths.

As shown in FIG. 8, gates 804, 806 and 808 define a critical path and therefor should be sized up. Moreover, gates 802 and 808 define a possible critical path and should also be sized up. However, gates 810–816 are neither on a critical path nor possible critical path and therefor should be sized down.

Inside a path, different gates may have different driving resistance and loading capacitance. Intuitively, the gates with larger load should be sized up more. The optimal size for a gate can be determined with reference to FIG. 9.

Figure 9:
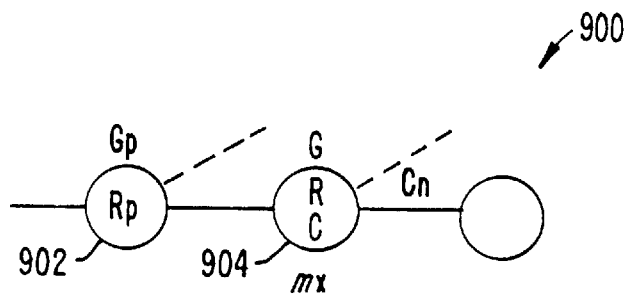
FIG. 9 shows transistor resizing on a portion of a critical path.

FIG. 9 shows a portion of a critical path. Gate 904 has resistance R and capacitance C. Its loading capacitance is $C_N$ and the previous gate (i.e., gate 902) has a resistance $R_p$. Suppose we want to change the size of gate 904 by m times, then the delay due to gate 904 can be represented by Equation 4:

$$D = \ldots + R_p x m \cdot C + \frac{R}{m} \times C_n + \ldots \quad \text{(EQ 4)}$$

The optimal value for m to minimize delay D can be computed from the derivative of D with respect to m (Equation 5):

$$\frac{d}{dm} D = 0 \Rightarrow m_{opt} = \frac{\sqrt{R \times C_n}}{R_p \times C} \quad \text{(EQ 5)}$$

This optimal value of a transistor is determined from the output capacitance and the resistance of the previous gate. Since the neighboring transistor sizes are subject to change during the resizing procedure, Equation 5 is not suitable for enhancing circuit efficiency by resizing more transistors during each iteration. Another problem with Equation 5 is that it only reduces the delay of the underlined path. It will very likely increase the delay of the other paths. Therefore, Equation 5 can only offer a direction about how to change the transistor sizes.

Since dramatic change on the transistor size is impractical, transistor resizer 416 avoids this problem by setting a resizing bound at each iteration (i.e., scale_up, scale_down and threshold, as discussed below). Within that bound, the new sizes of transistors are computed according to their loading capacitance, driving capability and delay/power data. This computation starts from the primary outputs towards the inputs so that the change in the output load can be updated. This resizing scheme also eases the control of constraints on transistor sizes.

With respect to power demands, the transition activities at each node need to be taken into account. The transistors connected to a highly switching nodes should be kept smaller to reduce the load of that node. As shown in FIGS. 3 and 4b, second run core 316 (which includes transistor resizer 416) runs power simulation 406b at each iteration to determine the actual switching activities at each node. The switching count at each node will be collected to help adjust the sizes of the transistors. This information can take glitching power into account and reflects the correct switching activities under the current delay conditions.

Figure 10:
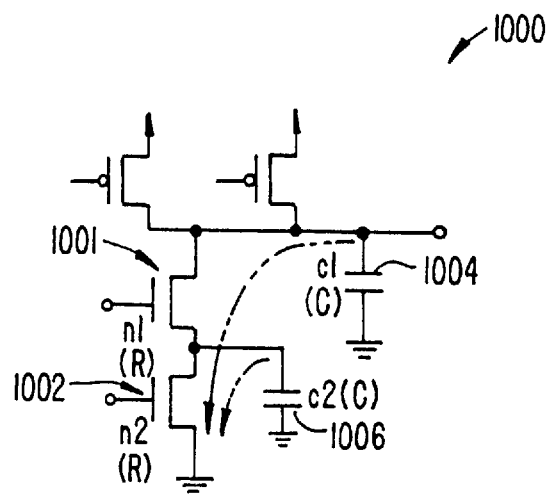
FIG. 10 shows transistor resizing within a single gate.

Finally, if the users allow different transistor sizes inside a gate, then there will be additional room for improvements. FIG. 10 shows a simple two-input NAND gate 1000. When discharging, transistor 1001 drives capacitor 1004, while transistor 1002 drives both capacitors 1004 and 1006. If only the size of transistor 1001 is doubled, the discharging delay will be 2.5RC. This is illustrated in Equation 6, where "R" is the individual resistance of transistors 1001 and 1002, and "C" is the individual capacitance of capacitors 1004 and 1006.

However, if transistor 1002 is sized-up instead, the delay will be 2RC, as shown in Equation 7. Thus, for the same area overhead, it is more economical to increase the size of transistor 1002 since it drives more capacitors. This effect is more significant if the internal capacitance of a gate is comparable with its output capacitance. Also, it is very useful to fix a specific rise/fall time problem.

$$n1(2x): \quad \text{(EQ 6)}$$
$$\frac{R}{2} \times C + R \times 2C = 2.5RC$$

$$n2(2x): \quad \text{(EQ 7)}$$
$$R \times C + \frac{R}{2} \times 2C = 2RC$$

Figure 11A:
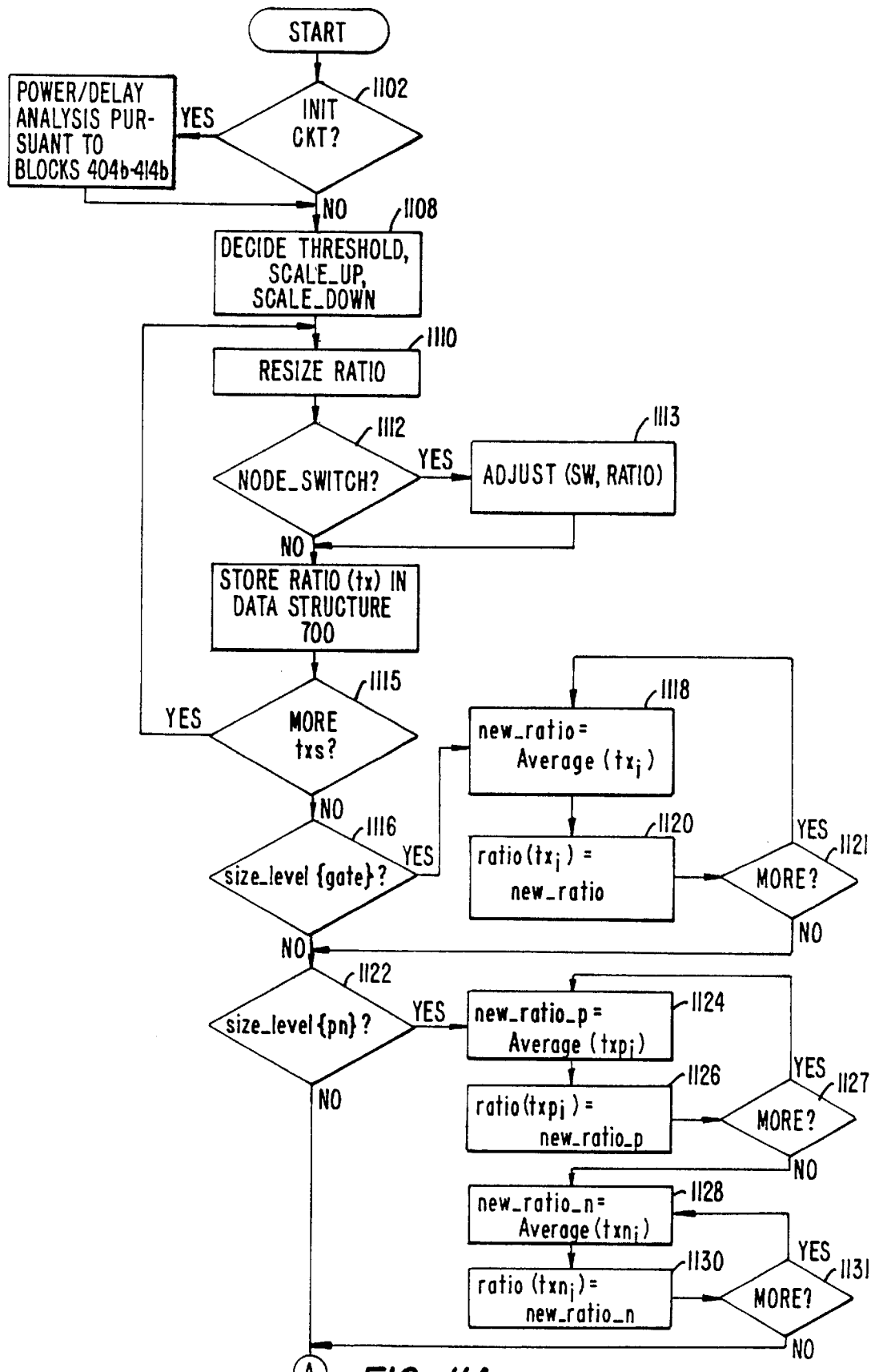
FIGS. 11*a* and 11*b* together display a flow chart describing ratio value determination.
Figure 11B:
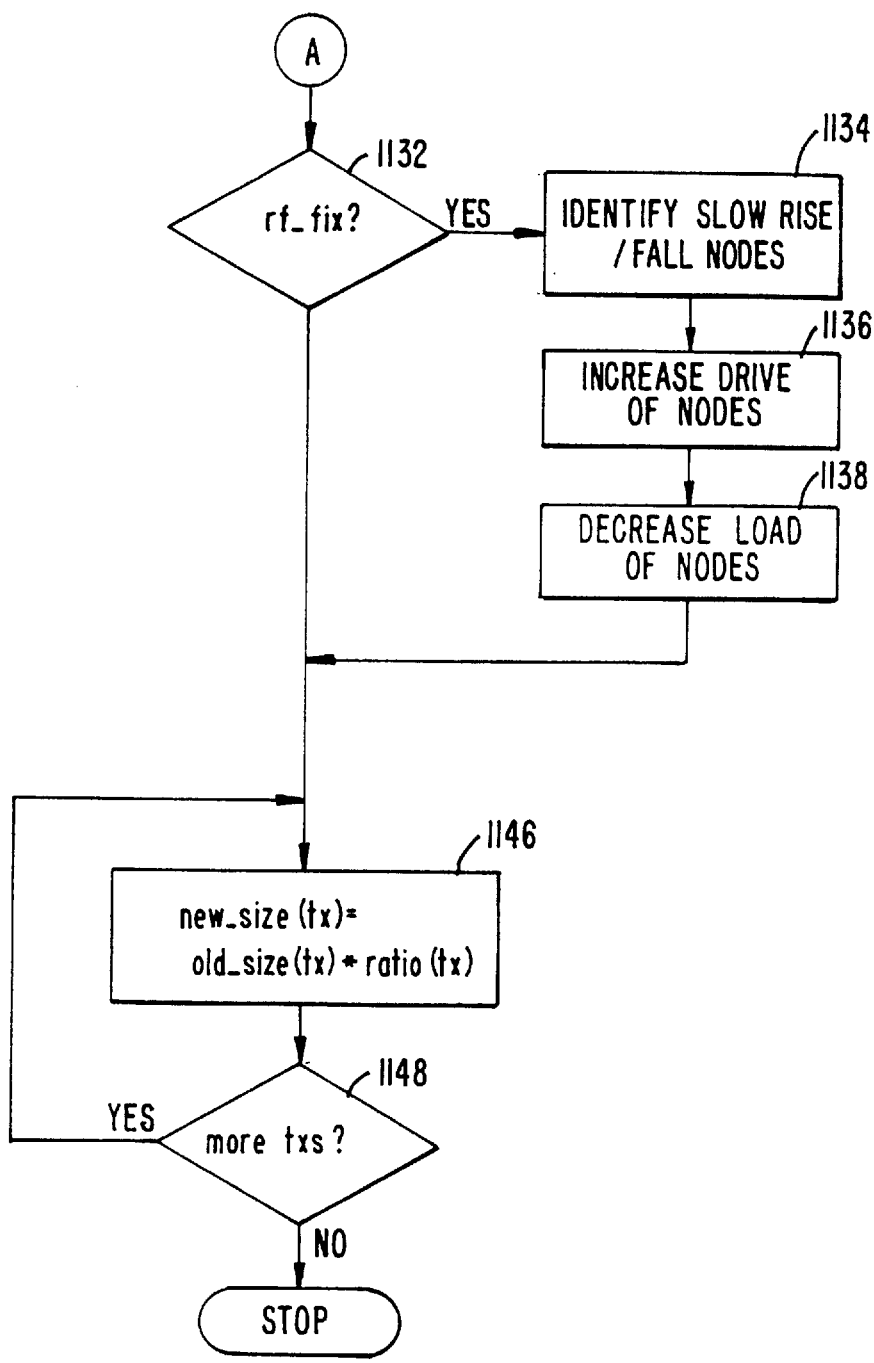

The operation of transistor resizer 416 is more clearly illustrated in flow chart 1100 in FIGS. 11a, 11b and the pseudo code in FIGS. 12, 13.

Referring to FIG. 11a, an initial circuit presented for iterative analysis is first examined in block 1102 to determine whether the circuit is a product of the "init" configuration command. If yes, the circuit undergoes power and timing analysis in block 1104 (in accordance with block 316 above) since no power or delay analysis was performed in block 312 (FIG. 3). Once power and timing data is obtained, this information is forwarded to block 1108.

Alternatively, if the initial circuit is a product of "default" or "search" initial searching, power and timing analysis has already been calculated in block 312 and this information is forwarded directly to block 1108.

Blocks 1108–1146 represent activity within transistor resizer block 416 of FIG. 4b. In block 1108, resizing bounds "scale_up," "scale_down" and "threshold" are determined. Scale_up represents the upper bound of iterative transistor sizing; typically this value is no larger than 3. Scale_down represents the lower bound of iterative transistor sizing; this value floats between 0 and 1. Threshold is the triggering value that determines whether a transistor is sized up or sized down. There are separate thresholds for scale_up and scale_down. All four values are determined dynamically during each transistor sizing iteration (as illustrated in flow chart 1100) based on a variety of factors.

Specifically, the values of scale_up, scale_down and thresholds are a function of at least the user's requirements (i.e., configuration file design constraints), type of execution mode (i.e., cost function, requirement mode or slack mode) and relative improvement achieved in the last transistor resizing iteration.

Scale_up and scale_down are increased if one or more of the foregoing factors indicate delay can and should be reduced (i.e., max_tx_size is larger than current transistor size; delay coefficient in cost function mode dominates cost calculation; delay requirement in corresponding requirement mode is not met; and/or previous iteration that increased transistor sizes resulted in a decrease in delay without violating any user requirements). Of course, if one or more of these factors are reversed, scale_up and scale_down may be decreased. However, scale_up will never equal 0 since some transistors may need to be sized up—even when the delay requirement in requirement mode is satisfied—to accommodate performance rules in scaling down other transistors.

Additionally, scale up and scale_down values are decreased if one or more of the foregoing factors indicate power can and should be reduced (i.e., min_tx_size is smaller than current transistor size; power coefficient in cost function mode dominates cost calculation; power requirement in corresponding requirement mode is not met; and/or previous iteration that decreased transistor sizes resulted in a decrease in power without violating any user requirements).

The threshold value calculation is analogous to scale_up and scale_down. Specifically, if the circuit being processed requires more delay improvement (based at least on the foregoing factors), the scale_up threshold value is decreased so a greater number of transistors may be increased in size. However, if this circuit demands greater power improvement, the scale_down threshold value is increased so a greater number of transistors may be decreased in size.

A detailed presentation of calculation of scale_up, scale_down and threshold values is provided in FIG. 11c. In this figure, case 0 and 1 apply to cost function mode, case 2 applies to delay requirement mode and case 3 applies to power requirement mode.

Additionally, a detailed presentation of calculation of scale_up and threshold for scale_up in slack-driven mode is provided in FIG. 11d. In slack-driven mode, threshold for scale_up and scale_down are the same, and scale_down is equal to the square of the threshold value.

Identification of select variables in FIG. 11c is provided in Table 6:

TABLE 6

| Variable | Definition |
| --- | --- |
| d_cost | Delta cost (improvement from last iteration) |
| max_pd | maximum path delay of current iteration |
| scale | scale_up |
| pdp | threshold for scale_up |
| s2 | scale_down |
| p2 | threshold for scale_down |
| dreq | delay requirement set by user |
| in_linear | linear interpolation of constants in parenthesis |
| power | current power measurement |
| preq | power requirement set by user |
| max_slk | maximum slack |

Once the scale_up, scale_down and threshold values are determined in block 1108, new transistor ratios are calculated in block 1110. In blocks 1110 through 1115, transistor resizer 416 serially steps through a circuit undergoing resizing analysis (the "subject circuit") and determines a preliminary ratio value for each transistor in the circuit one transistor at a time. (As discussed below, the ratio value is used to calculate a new transistor size.) Pseudo code that describes the new size calculation in block 1110 is provided in FIG. 12.

Referring to FIG. 12, the following parameters are passed to the transistor resizer routine in block 1110: threshold, scale_up, scale_down and circuit (i.e., netlist). For each transistor in the circuit, the associated path_delay ("pd;" element 710) and loading capacitance (element 726) is retrieved from data structure 700 (FIG. 7). Maximum_path_delay (i.e., the delay value of the critical path of the subject circuit) is retrieved from delay analysis run on the subject circuit (i.e., either in block 412a for an initial circuit selected from "default" or "search" modes or in block 412b for "init" and subsequent circuits). Switching_activities (i.e., the number of toggles experienced by a transistor whose gate is coupled to a particular node) is retrieved from power simulation run on the subject circuit (i.e., either in block 406a for an initial circuit selected from "default" or "search" modes or in block 406b for "init" and subsequent circuits). Finally, maximum_cap is the largest load capacitance held in data structure 700.

For a transistor (i.e., "tx") currently being resized (the "current transistor") in the subject circuit, the associated path_delay is divided by the maximum_path_delay producing a "delay quotient". If this value is greater than the threshold value, the associated transistor is likely on the critical path of the circuit or on a possible critical path. Therefore, the transistor should be sized up to reduce delay. The first ratio-calculation equation in FIG. 12 (i.e., using the scale_up variable) calculates the ratio value (i.e., stw) for increasing the size of transistors.

However, if the delay quotient is less than the threshold, the associated transistor is not likely to be on the critical or possible critical paths and therefore should be sized down to reduce power consumption. The second ratio-calculation equation in FIG. 12 (i.e., using the scale_down variable) calculates the ratio value for decreasing the size of transistors.

In summary, the initial value of the ratio calculated in block 1110 is based on the likelihood that the current transistor is or is not on the critical or a possible critical path. Upon calculating this value, transistor resizer 416 proceeds through a series of subsequent calculations to further refine the ratio value of the current transistor based on the particular attributes of the subject circuit.

In block 1112, transistor resizer 416 checks configuration command "node_switch" (described above). If this command is set "on," the switching_activities for the current transistor (i.e., the number of times the transistor toggled during simulation) is retrieved from the power simulation data structure. This value and the initial ratio calculated for the current transistor (from the equations mentioned above) are input into a routine called "adjust" in block 1114, which will decrease the value of the ratio for highly active nodes (and thereby reduce power). The details of the adjust routine are provided in FIG. 13.

Referring to FIG. 13, the parameters ratio and SW are passed to "adjust." SW is normalized to the maximum switching activity. If the ratio for the current transistor is greater than 1.5, a new ratio value is calculated based on this value (i.e., 1.5) SW and the ratio value. Alternatively, if the ratio is less than 1, a new value is calculated based on the scale_down variable. If the ratio value is greater than or equal to 1 and less than or equal to 1.5, it remains unchanged. These values are based on empirical data.

Referring to FIG. 11a, the newly calculated ratio value for the current transistor of the subject circuit is stored in element 730 of data structure 700 (FIG. 7) in block 1114. Additionally, element 732 ("visited") of the corresponding data structure is set to indicate a new ratio value for this transistor has been calculated.

The next transistor to be evaluated in the subject circuit (i.e., a "new" current transistor) is searched for in block 1115. If a new transistor is located, the flow of operation returns to block 1110 to repeat the foregoing operation. Alternatively, if no more transistors are present (i.e., visited field 732 of all transistor parameter records is set), the flow of operation proceeds to block 1116.

In block 1116, transistor resizer 416 checks configuration command "size_level" (described above). If this command is set at the gate level, all transistors which are channel connected (i.e., a "pseudo gate") are resized together at the same ratio. Specifically, the individual ratio value for each transistor held in data structure 700 included in a pseudo gate is input into a routine called "Average" in block 1118. Routine Average calculates the average value of these ratios by summing the individual ratio values (i.e., ratio($tx_i$)) and dividing this summation by the number of transistors included in the pseudo gate. The result, "new_ratio," is then placed in location stw 730 (FIG. 7) for each affected transistor in block 1120.

The subject circuit is then checked for any other pseudo gates in block 1121. If another is found, operation returns to block 1118 to repeat the foregoing operation on a new pseudo gate. If no more gates are present, the flow of operation proceeds to block 1122.

Alternatively, if configuration command "size_level" is set to the "pn" level, all channel-connected p transistors and n transistors are resized together at the same p and n ratio, respectively. Specifically, the individual ratio value for each channel connected p transistor held in data structure 700 included in a particular pseudo gate is input into a routine called "Average" in block 1124. Routine Average calculates the average value of these ratios by summing the individual ratio values (i.e., ratio($tx_{pi}$)) and dividing this summation by the number of p transistors included in the pseudo gate. The result, "new_ratio_p," is then placed in location stw 730 (FIG. 7) for each affected transistor in block 1126.

The subject circuit is then checked for any other pseudo gates in block 1127. If another is found, operation returns to block 1124 to repeat the foregoing operation on a new pseudo gate. If no more gates are present, the flow of operation proceeds to block 1128, where the identical operations performed in blocks 1124–1127 are subsequently carried out in blocks 1128–1131, respectively, for n transistors.

Finally, if the size_level command is absent from configuration file 304 (FIG. 3), ratio values remain calculated at the transistor level (i.e., no averaging is performed), and the flow of operation proceeds to block 1132 in FIG. 11b.

In block 1132, transistor resizer 416 checks configuration command "rf_fix" (described above). If this command is set on, the user will set a threshold value to identify slow rise/fall nodes in block 1134. Rise/fall time is determined during power simulation. If, for example, the POWERMILL software is used for power simulation, then nodes with excessive rise/fall time may be identified dynamically, as described in U.S. patent application Ser. No. 08/231,207.

Figure 16:
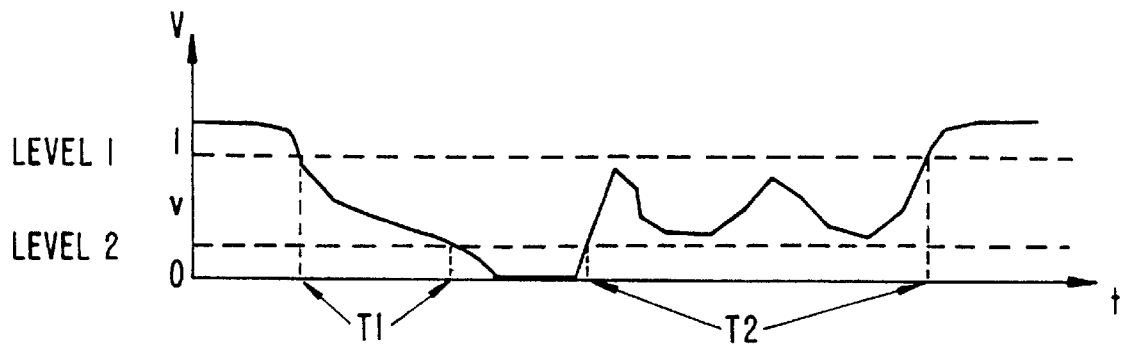
FIG. 16 is a graph of node voltage with respect to time.

More specifically, FIG. 16 is a copy of FIG. 22 from U.S. patent application Ser. No. 08/231,207. This figure shows a graph of node voltage with respect to time. By monitoring the node voltage, POWERMILL software detects excessive rise/fall times at particular nodes. A designer predetermines thresholds for level 1 and level 2. During a dynamic testing period, POWERMILL software determines periods, such as T1 and T2, where the voltage level lies between level 1 and level 2. For those periods where the voltage remains between level 1 and level 2 for longer than a predefined threshold time, POWERMILL software reports excessive rise/fall time condition.

Returning to FIG. 11b, nodes with slow rise/fall times are identified in block 1134. In block 1136, transistors whose source or drain is connected to the nodes identified in block 1134 (this information may be retrieved from netlist file 306 which is read in by the power simulation and delay analysis software) are sized up to increase the drive capacity and thereby decrease the response times of the slow nodes (i.e., the associated ratios are increased in size).

Specifically, a variable "term" is calculated in accordance with equation 8:

$$\text{term} = \left( \frac{rf}{\text{user\_}rf} \right)^{1/2} \tag{EQ 8}$$

In EQ 8, rf is the measured rise/fall time (i.e., from power simulation) and user_rf is user rise/fall time specified by rf_fix. Upon calculating term, the associated ratios are sized up in block 1136 in accordance with equation 9:

$$\text{ratio\_new} = \text{ratio} * \text{term} \tag{EQ 9}$$

This ratio_new value is placed in stw field 730 of the transistor parameter record (FIG. 7c) for each affected transistor.

Further, in block 1138, transistors whose gate is connected to the nodes identified in block 1134 (again, this information may be retrieved from netlist file 306) are sized down to decrease the load and thereby further decrease the response times of the slow nodes (i.e., the associated ratios are decreased in size).

Specifically, a variable "gate" is calculated in accordance with equation 10:

$$\text{gate} = \left( \frac{\text{user\_}rf}{rf} \right)^{1/2} \tag{EQ 10}$$

Again, this ratio_new value is placed in stw field 730 of the transistor parameter record (FIG. 7c) for each affected transistor.

In EQ 10, rf and user_rf have the same meaning as indicated above in EQ 8. Upon calculating gate, the associated ratios are sized down in block 1138 in accordance with equation 11:

$$\text{ratio\_new} = \text{ratio} * \text{gate} \tag{EQ 11}$$

Again, this ratio_new value is placed in stw field 730 of the transistor parameter record (FIG. 7c) for each affected transistor.

Upon completing the rf_fix operation in blocks 1134–1138 (or skipping this operation entirely if rf_fix is not specified in block 1132), operation flows to block 1146.

Upon determining the ratio value for each transistor in the subject circuit (and updating this value in element 730 of each transistor parameter record in data structure 700; FIG. 7), this value is multiplied with the corresponding previous transistor width (i.e., i.e., old_size(tx) held in the parameter data structures for power simulation and delay analysis; i.e., field 736 of FIG. 7a) to obtain a new transistor width (i.e., new_size(tx)) in block 1146. This new value is loaded into power simulation and delay analysis transistor parameter data structures analogous to data structure 700. This process is carried out for each transistor in the subject circuit via block 1148 until every transistor has been resized.

3. Stop_Check

FIG. 14 represents pseudo code of the stop_check block 318 of FIG. 3. After new transistor sizes are calculated but before power simulation and delay analysis is run on these new values, the stop_check block decides whether analysis should proceed.

Referring to the second line of code in FIG. 14, an initial determination is made as to whether the iterative analysis has proceeded beyond the maximum allowable number of iterations. If yes, the analysis ends. If no, the performance of engine 320 is evaluated against a user-defined threshold to determine whether analysis should terminate based on poor performance.

More specifically, configuration command "degrade_thresh" (described above) enables the user to set a threshold for degradation of power or delay. If the level of power or delay from one iteration to the next worsens by more than this threshold value, analysis terminates. The threshold value has no units. It is a percentage based on the maximum value of delay or power in a current iteration (i.e., a threshold of 90% for delay means 90% of maximum path delay).

Each execution mode uses this threshold value in a similar way. In each case, if the threshold is not exceeded, analysis continues and the flow of operation returns to block 316 via line 324 in FIG. 3. However, analysis will terminate in each execution mode under the following conditions:

TABLE 7

| Execution Mode | Analysis Terminates When: |
| --- | --- |
| Cost Function | If the change in cost (i.e., increase) from the previous iteration to the |

TABLE 7-continued

| Execution Mode | Analysis Terminates When: |
|---|---|
|  | current iteration exceeds the threshold percentage. |
| Delay Requirement | If the delay requirement is met and the change in power (i.e., increase) from the previous iteration to the current iteration exceeds the threshold percentage. |
| Power Requirement | If the power requirement is met and the change in delay (i.e., increase) from the previous iteration to the current iteration exceeds the threshold percentage. |
| Slack | If slack requirement is met and the change in power (i.e., increase) from the previous iteration to the current iteration exceeds the threshold percentage. |

Once analysis terminates, operation flows to block 332 of FIG. 3, which generates output for transistor autosizing engine 320.

4. Output

Figure 18:
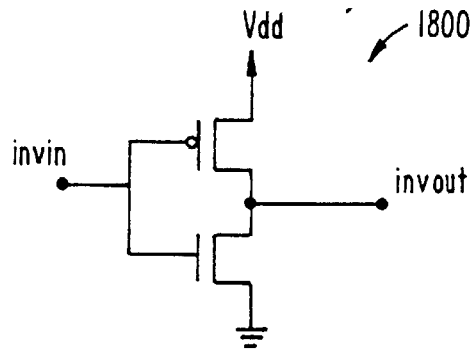
FIG. 18 is a schematic of a conventional inverter.
Figure 19:
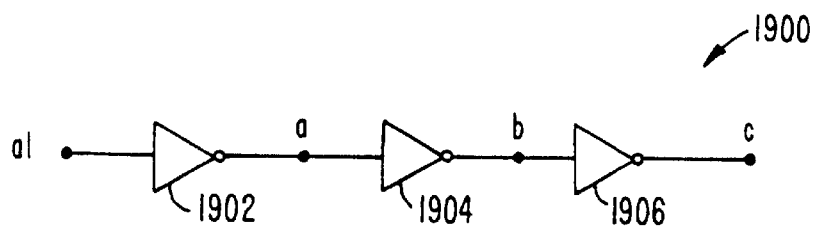
FIG. 19 is a schematic of a circuit represented by a netlist and undergoing transistor resizing by transistor autosizing system.

FIGS. 20–24 show execution reports for five different execution modes: slack-driven mode (FIG. 20), delay requirement mode (FIG. 21), power requirement mode (FIG. 22), cost function mode defined by addition (FIG. 23) and cost function mode defined by multiplication (FIG. 24). The circuit under analysis in each report is circuit 1900 shown in FIG. 19. Each inverter of this simple circuit (i.e., inverters 1902, 1904 and 1906) is constructed from the standard inverter circuit 1800 shown in FIG. 18. Accordingly, circuit 1900 includes six transistors.

Transistor sizes are not displayed in the execution reports of FIGS. 20–24 due to the typically large volume of transistors making up a subject circuit. These values are maintained in separate transistor parameter data structures accessed by power simulation and delay analysis software. Exemplary data structures are shown in FIG. 7a.

Referring to FIG. 20, a typical execution report includes a header portion 2002 which reveals the mode (slack-driven in this case), max_tx_size (300 um in this case), min_tx_size (1.0 um in this case), use of wire_cap_est command (wire), use of node_switch command (toggle), argument of size_level command (transistor level in this case) and the number of elements making up the subject circuit.

The execution report also includes the results of initial searching in portion 2004. The initial circuit, scaling circuit and changing circuit are identified with the abbreviations "Initial," "S," and "C," respectively. In this case the scaling factor equals 0.5, and the smallest transistor size is 1.0 um. Since the changing circuit has the best slack value (i.e., +5.63), engine 320 selects this circuit as the initial circuit for transistor autosizing.

Finally, portion 2006 of the report of FIG. 20 illustrates power and simulation values obtained for 10 different sizes of transistors.

G. Cell Selection

Given a conventional, predefined cell library in which there are different sized cells for the same functionality, transistor autosizing engine 320 can characterize the delay and power performance of all the cells. Based on this characterization and an evaluation of the values, engine 320 can select the appropriate cell(s) to reduce the delay and power subject to the requirements of the user.

This operation avoids transistor autosizing (i.e., no new ratio value is calculated) by using the delay and power requirements as guides for selecting among several cell choices. These cell choices have varied but fixed transistor sizes. Once a cell is chosen, it is simply swapped into the subject circuit. While the results may be less exact than the autosizing analysis described above, the process is much faster enabling cells (i.e., portions of the subject circuit) to be repeatedly swapped after each iteration while searching for an optimal solution.

Figure 27:
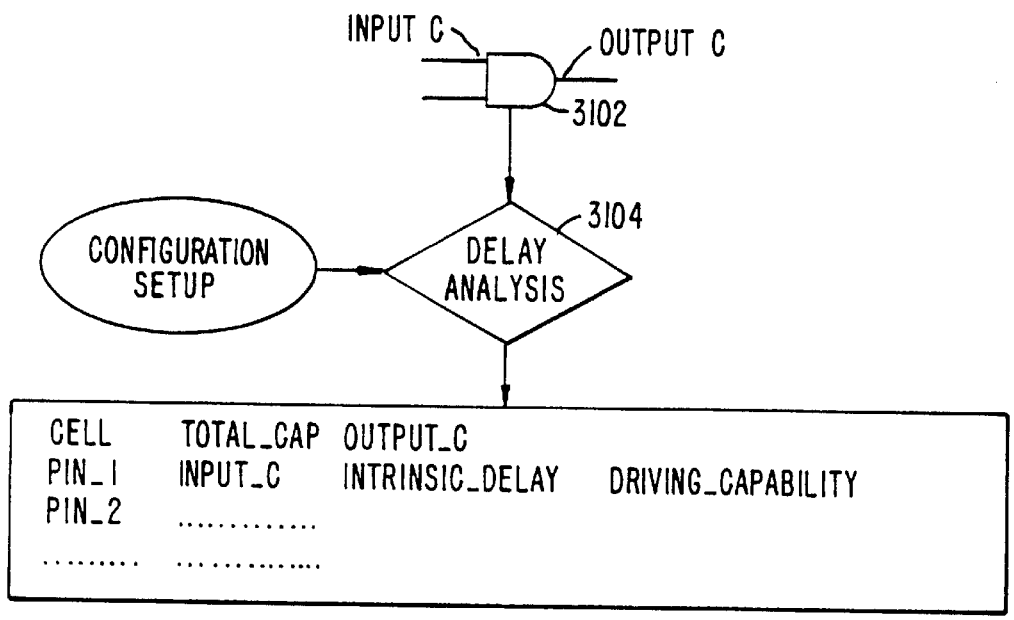
FIG. 27 illustrates methodology of cell characterization.

Referring to FIG. 27, engine 320 characterizes a conventional cell 3102 through delay analysis 3104. This characterization includes total_cap (summation of capacitance of all nodes in gate), output_c (capacitance of gate output), input_c (capacitance of gate input), intrinsic delay and driving capability.

Figures 29, 30:
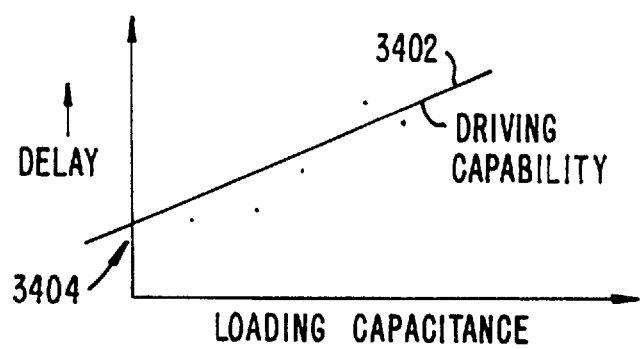
FIG. 29 illustrates cell comparison.
FIG. 30 illustrates derivation of cell driving capability and intrinsic delay value.

Referring to FIG. 30, intrinsic delay and driving capability of cell 3102 are determined based on a linear approximation of a number of data points. The slope of approximation line 3402 and its y-intercept 3404 equals the driving capability (unit ohms) and intrinsic delay, respectively, of cell 3102.

Figure 28:
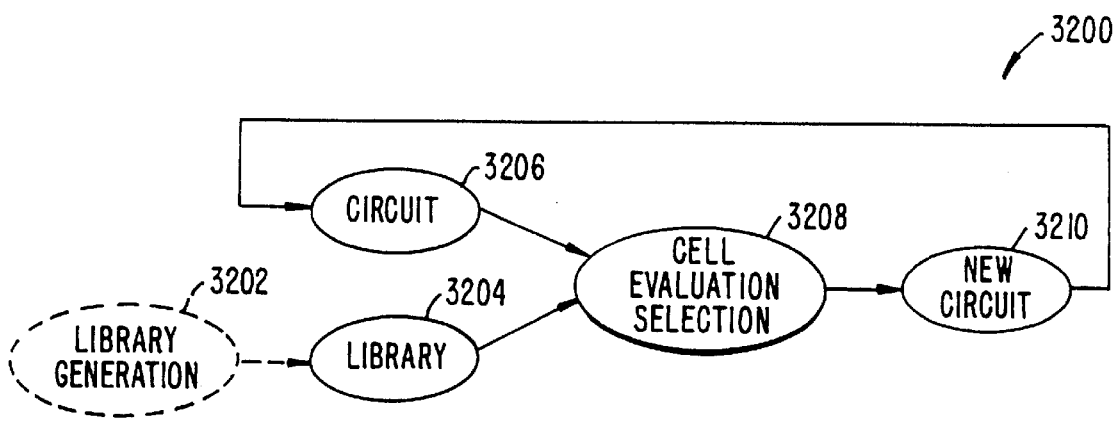
FIG. 28 is a flow chart describing cell swapping.

Transistor resizing through cell swapping is illustrated in FIG. 28. Library generation (if necessary) and cell characterization (FIG. 27) is performed in block 3202. The finished library 3204 and subject circuit 3206 are accessed for cell evaluation and selection in block 3208. Once cell(s) are chosen, a new circuit is created in block 3210. The process is repeated until maximum iterations are reached or design criteria is satisfied.

Cell evaluation of block 3208 is more clearly described in FIG. 29. The delay of cell 3302 is provided by equation $D_1$, whose elements are intrinsic delay ($d_{01}$), driving capability ($d_1$), load capacitance ($C_L$), previous driving capability ($d_p$) and input capacitance ($C_1$) of cell 3302. The delay of cell 3304 is provided by equation $D_2$, which is the same calculation as $D_1$ but using elements associated with cell 3304.

The delay saved between use of cell 3302 and cell 3304 is provided by the delta D ($\Delta D$) equation of FIG. 29.

The power consumption of each cell is defined as the summation of power consumption at each node within the cell. Nodal power consumption is the product of nodal capacitance ($C_i$) and switching activity ($t_i$). Switching activity is the number of state changes for a particular node during a simulation.

The power saved between use of cell 3302 and cell 3304 is provided by the delta P equation ($\Delta P$) of FIG. 29.

During cell evaluation, each cell within circuit 3206 having a functional equivalent in library 3204 is targeted for swapping in a single iteration. Each cell within library 3204 having identical functionality with the targeted cells in the circuit is compared with the cells. This comparison requires the calculation of $\Delta D$ and $\Delta P$ between each library cell and its functional equivalent in the circuit. The library cells producing the largest values of $-\Delta D/\Delta P$ (i.e., delay saved/ power overhead) are chosen as replacements, and are swapped into circuit 3206.

H. Wiring Capacitance

As transistor sizes keep shrinking, the loading capacitance coming from interconnect wires becomes more and more significant. Without considering the wiring load, there is no delay penalty by reducing the sizes of all the transistors, which is very unrealistic. If the circuit has been laid out, the wiring capacitance can be extracted and back annotated into the transistor netlist. If the circuit is a pre-layout design, then engine 320 offers an estimation formula to predict the wiring load. This formula can be customized by the user. One important issue in this estimation is that the transistor sizes may change dramatically during the sizing procedures. This change can affect the total area of the circuit and thus the layout area. It is justifiable to reduce the estimation for wiring capacitance when the layout area reduces. To foresee this effect, the default estimation formula takes the transistor area as a parameter to predict the wiring capacitance.

As noted above, wiring capacitance estimation can be turned on by a configuration command (i.e., "wire_cap_est"). If the wiring estimation is turned on, the capacitance of each node will be increased by an estimation amount accounting for the wiring effects. A user can also customize the estimation formula through a command-line option "-u" (which specifies the file that can customize a wire capacitance estimation formula). The user may utilize any of the parameters identified at the top of the routine in FIG. 15.

The operation related to wiring capacitance is illustrated in the C code in FIG. 15. This operation takes place prior to performing power simulation and delay analysis. More specifically, it occurs during preprocessing block 612 of FIG. 6. In preparation for power simulation and delay analysis, engine 320 checks wire_cap_est command. If this command is set "on," the routine shown in FIG. 15 is carried out.

Referring to FIG. 15, the first two lines set FANIN_CAP and FANOUT_CAP to set values. These values are derived from empirical analysis, user design environment (i.e., type of layout tools) and user technology. Further in the routine, the variable fanin is defined as a summation of the number of channels connected to the subject node and the number of outputs. Similarly, fanout is defined as a summation of the number of gates connected to the subject node, number of inputs and number of biputs. The variables in FIG. 15 include number_channel (number of channel connected transistors), number_gate (number of gate connected transistors and number_input, number_output, and number_biput (I/O connections specified by user).

Next, a scaling factor ("fanout_scale") is selected based on the number of fanouts. The options are shown in FIG. 15. This scaling factor is also derived from empirical analysis. A preliminary cap value for the node is calculated using equation 12:

$$\text{cap} = \text{fanin}*\text{FANIN\_CAP} + \text{fanout}*\text{FANIN\_CAP}*\text{fanout\_scale} \quad \text{(EQ 12)}$$

The effect of area on capacitance is considered through equation 13:

$$\text{area\_effect} = \left(\frac{\text{area}}{200}\right)^{1/3} \quad \text{(EQ 13)}$$

In EQ 13, "area" is the total width of transistors coupled to the subject node.

Finally, a new cap value for the subject node is determined by multiplying the results of EQ 12 and EQ 13 together. This new value is stored in the transistor parameter data structures for power simulation and delay analysis for use by transistor resizer 416.

Through this method, extra capacitance at particular nodes may be estimated to account for wiring load.

I. Functionality

Without correct functionality, any performance enhancement is meaningless. In only a small range of digital combinational circuits is delay the only factor to affect functionality. For most custom designs, functionality is vulnerable during the transistor sizing. Simulation is therefore crucial to ensure correct functionality in each iteration. Setting very strict constraints on the transistor sizes may ensure the functionality to some extent. But this will also cause dramatic loss in the achievable performance. By running a power simulation at each iteration, engine 320 is able to verify the correctness of the functionality.

J. Under Development

Figure 17:
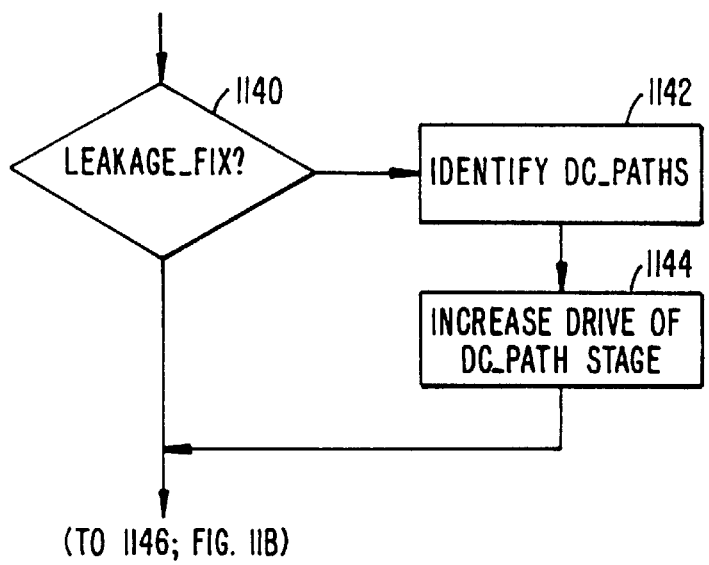
FIG. 17 is a flow chart describing "leakage_fix" configuration command.

An additional configuration command currently under development is "leakage_fix," whose operation is shown in FIG. 17. This operation is anticipated to be placed between blocks 1132 and 1146 in FIG. 11b. Referring to FIG. 17, transistor resizer 416 checks configuration command "leakage_fix" in block 1140. If this command is set "on," the paths of the subject circuit that exhibit coupling between power and ground (i.e., direct current paths: "dc_paths") are identified in block 1142. DC_paths are determined during power simulation.

More specifically, power simulation identifies dc_paths as those paths coupling power to ground immediately prior to input transition. Under desired operating conditions, any switching activity will be complete immediately prior to receiving a new input signal. However, if switching operations are still on-going immediately prior to receipt of new input, then this is indicative of weak driving transistors. Therefore, these transistors should be sized up.

Returning to FIG. 17, sets of channel connected transistors forming direct current paths ("dc_paths") are identified in block 1142. In block 1144, transistors included in each set are sized up to increase the drive of the dc_path stage (i.e., the associated ratios are increased in size). The same calculations performed in rf_fix to size up transistors (i.e., EQ 8 and EQ 9) are used in this operation.

Upon completing the leakage_fix operation in blocks 1142–1144 (or skipping this operation entirely if leakage_fix is not specified in block 1140), operation flows to block 1146 in FIG. 11b.

The invention has now been described in terms of a preferred embodiment. Modifications and substitutions will now be apparent to persons of ordinary skill in the art. Accordingly, it is not intended that the invention be limited except as provided by the appended claims.

What is claimed is:

1. In a programmed digital computer, a method of minimizing signal delay and power consumption of a selected circuit, wherein the selected circuit includes a plurality of circuit paths constructed from transistors and nodes, said method comprising the steps of:

determining a time delay of each path in said selected circuit, wherein a time delay of greatest value is associated with a critical path of said selected circuit;

selecting a first transistor, said first transistor residing in a first path in said selected circuit having a first time delay;

simulating operation of said selected circuit;

counting state switches of a first node of said selected circuit during said simulation step, said first node being coupled to said first transistor; and resizing said first transistor based upon a number of state switches occurring at said first node, wherein said resizing step includes the steps of:

sizing up said first transistor when said first time delay normalized to the time delay of greatest value exceeds a predetermined threshold value; and sizing down said first transistor when said first time delay normalized to the time delay of greatest value is less than said predetermined threshold value.

2. The method of claim 1 further comprising the steps of:

estimating wiring capacitance of said first node in said selected circuit based upon fanin and fanout and area of said first node.

3. The method of claim 1 further comprising the step of:
inputting a netlist of an original circuit into said computer, said original circuit including a plurality of circuit paths and transistors included in these paths;
generating a scaling circuit from said netlist of said original circuit, said scaling circuit having transistor widths that are scaled values of transistor widths in said original circuit;
generating a changing circuit from said netlist of said original circuit, said changing circuit having transistor widths that are uniform; and
choosing said selected circuit from said original, scaling and changing circuits based on user-selected criteria.

4. The method of claim 3 wherein said user-selected criteria is power consumption of said original, scaling and changing circuits.

5. The method of claim 3 wherein said user-selected criteria is a cost function based on power, delay and area of said original, scaling and changing circuits.

6. The method of claim 3 wherein said user-selected criteria is delay of said original, scaling and changing circuits.

7. In a programmed digital computer, a method of minimizing signal delay and power consumption of a selected circuit, wherein the selected circuit includes a plurality of circuit paths constructed from transistors and nodes, said method comprising the steps of:
determining a time delay of each path in said selected circuit, wherein a time delay of greatest value is associated with a critical path of said selected circuit;
identifying all transistors that are channel connected in a pseudo gate within said selected circuit;
determining an average ratio value associated with said pseudo gate based on individual ratio values associated with each of said all transistors, said ratio value being a function of time delays associated with one or more circuit paths;
assigning said average ratio value to each of said all transistors in a data structure stored in a computer-readable medium; and
resizing each of said all transistors using said average ratio value.

8. The method of claim 7 wherein said average ratio value comprises an average p-type ratio value and an average n-type ratio value and wherein said determining step comprises the steps of:
determining an average p-type ratio value derived from individual ratio values associated with each of said all transistors that are p-type transistors; and
determining an average n-type ratio value derived from individual ratio values associated with each of said all transistors that are n-type transistors, said p-type and n-type ratio values being functions of time delays associated with one or more circuit paths.

9. The method of claim 7 wherein said data structure comprises an array of transistor parameter records, each of said parameter records including a plurality of fields containing data.

10. The method of claim 7 further comprising the step of:
inputting a netlist of an original circuit into said computer, said original circuit including a plurality of circuit paths and transistors included in these paths;
generating a scaling circuit from said netlist of said original circuit, said scaling circuit having transistor widths that are scaled values of transistor widths in said original circuit;
generating a changing circuit from said netlist of said original circuit, said changing circuit having transistor widths that are uniform; and
choosing said selected circuit from said original, scaling and changing circuits based on user-selected criteria.

11. The method of claim 10 wherein said user-selected criteria is a cost function based on power, delay and area of said original, scaling and changing circuits.

12. The method of claim 10 wherein said user-selected criteria is power consumption of said original, scaling and changing circuits.

13. The method of claim 10 wherein said user-selected criteria is delay of said original, scaling and changing circuits.

14. In a programmed digital computer, a method of minimizing circuit signal delay and power consumption comprising the steps of:
inputting into said computer a netlist of a first circuit, said first circuit including a plurality of circuit paths constructed from transistors and nodes;
generating a second circuit based on a modification of transistor size in said first circuit;
selecting a chosen circuit between said first and said second circuits based on circuit performance;
resizing a first transistor in said chosen circuit based on path delay;
performing a static timing analysis and power simulation of said chosen circuit; and
terminating transistor resizing when performance degradation exceeds a predetermined threshold.

15. The method of claim 14 wherein said predetermined threshold is based on a composite value of normalized power, delay and area values.

16. The method of claim 14 wherein said resizing step is further based on a number of state switches occurring at a node coupled to said first transistor.

17. The method of claim 14 wherein said resizing step includes the steps of:
determining a time delay of each path in said chosen circuit, wherein said first transistor resides in a select path having a select time delay and a critical path of said chosen circuit has a time delay of greatest value;
sizing up said first transistor when said select time delay normalized to the time delay of greatest value exceeds a predetermined threshold value; and
sizing down said first transistor when said select time delay normalized to the time delay of greatest value is less than said predetermined threshold value.

18. The method of claim 14 wherein said resizing step includes selecting a cell from a predefined cell library.

19. The method of claim 14 wherein said resizing step includes:
identifying all transistors that are channel connected with said first transistor in a pseudo gate;
determining an average ratio value associated with said pseudo gate based on individual ratio values associated with each of said all transistors, said ratio value being a function of time delays associated with one or more circuit paths;
assigning said average ratio value to each of said all transistor in a data structure stored in a computer-readable medium; and
resizing each of said all transistors using said average ratio value.

20. The method of claim 19 wherein said data structure comprises an array of transistor parameter records, each of said parameter records including a plurality of fields containing data.

* * * * *